United States Patent [19]

Ore et al.

[11] 4,196,172

[45] * Apr. 1, 1980

[54] HEMIHYDRATE TYPE PHOSPHORIC ACID PROCESS

[75] Inventors: Fernando N. Ore, Whittier; John D. Ellis, Huntington Beach; James H. Moore, La Verne, all of Calif.

[73] Assignee: Occidental Petroleum Corporation, Los Angeles, Calif.

[*] Notice: The portion of the term of this patent subsequent to Jan. 2, 1996, has been disclaimed.

[21] Appl. No.: 865,557

[22] Filed: Dec. 29, 1977

Related U.S. Application Data

[63] Continuation-in-part of Ser. No. 703,208, Jul. 7, 1976, Pat. No. 4,132,760, and a continuation-in-part of Ser. No. 703,138, Jul. 7, 1976, abandoned.

[51] Int. Cl.² .................... C01F 11/46; C01B 25/22
[52] U.S. Cl. .................... 423/167; 423/320; 423/266
[58] Field of Search ............. 423/167, 319, 320, 266

[56] References Cited

U.S. PATENT DOCUMENTS

| | | | |
|---|---|---|---|
| 1,836,672 | 12/1931 | Larsson | 423/167 |
| 2,968,544 | 1/1961 | Zeitz et al. | 423/320 |
| 3,257,168 | 6/1966 | Chelminski | 423/167 |
| 3,416,889 | 12/1968 | Caldwell | 423/320 |
| 3,418,077 | 12/1968 | Robinson | 423/167 |
| 3,453,076 | 7/1969 | Long et al. | 423/167 |
| 3,522,003 | 7/1970 | Sopker | 423/167 |
| 3,522,004 | 7/1970 | Sopker | 423/167 |
| 4,053,563 | 10/1977 | Somerville | 423/320 |

FOREIGN PATENT DOCUMENTS 1959122  5/1971  Fed. Rep. of Germany ......... 423/319

*Primary Examiner*—Herbert T. Carter
*Attorney, Agent, or Firm*—Barry A. Bisson; Robert A. Franks; William G. Lane

[57] ABSTRACT

Phosphate rock and sulfuric acid are reacted under conditions which result in the formation of calcium sulfate hemihydrate and phosphoric acid of about 35% to about 55% $P_2O_5$. A two vessel reaction system is used in which the reaction slurry undergoes intra- and inter- vessel circulation (preferably through a draft tube). The solution portion of the slurry in the first vessel (the "dissolver") is preferably maintained at a negative sulfate concentration (i.e. excess $Ca^{+2}$) and the solution in the second vessel (the "crystallizer") is preferably maintained at a positive sulfate ion concentration. Also preferred is that the second vessel be maintained at a reduced pressure, (e.g. to provide evaporation cooling). Better filtration rates can thus be obtained due to the favorable shape, dominant size and size distribution of the hemihydrate crystals. Most preferred is that a crystal modifier (e.g. a sulfonic acid, a sulfonic acid salt, tall oil fatty acids or alkoxylated or esterified tall oil fatty acids) be present in the crystallizer. Surprisingly, the sulfuric acid used in the process can be less (e.g., 0.5–10%) than the stoichiometric amount to convert the calcium in the feed phosphate rock to calcium sulphate.

16 Claims, 9 Drawing Figures

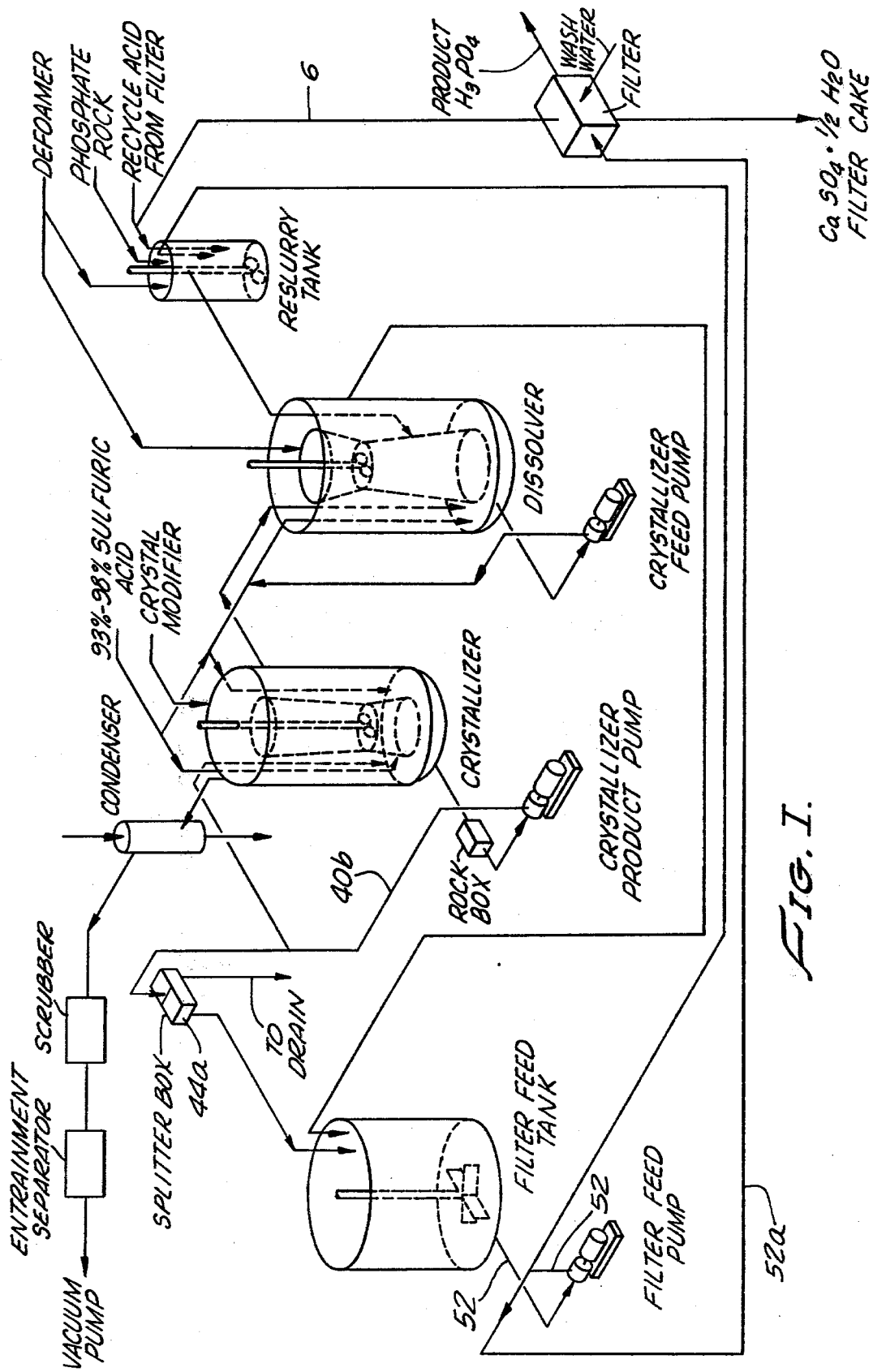
FIG. I.

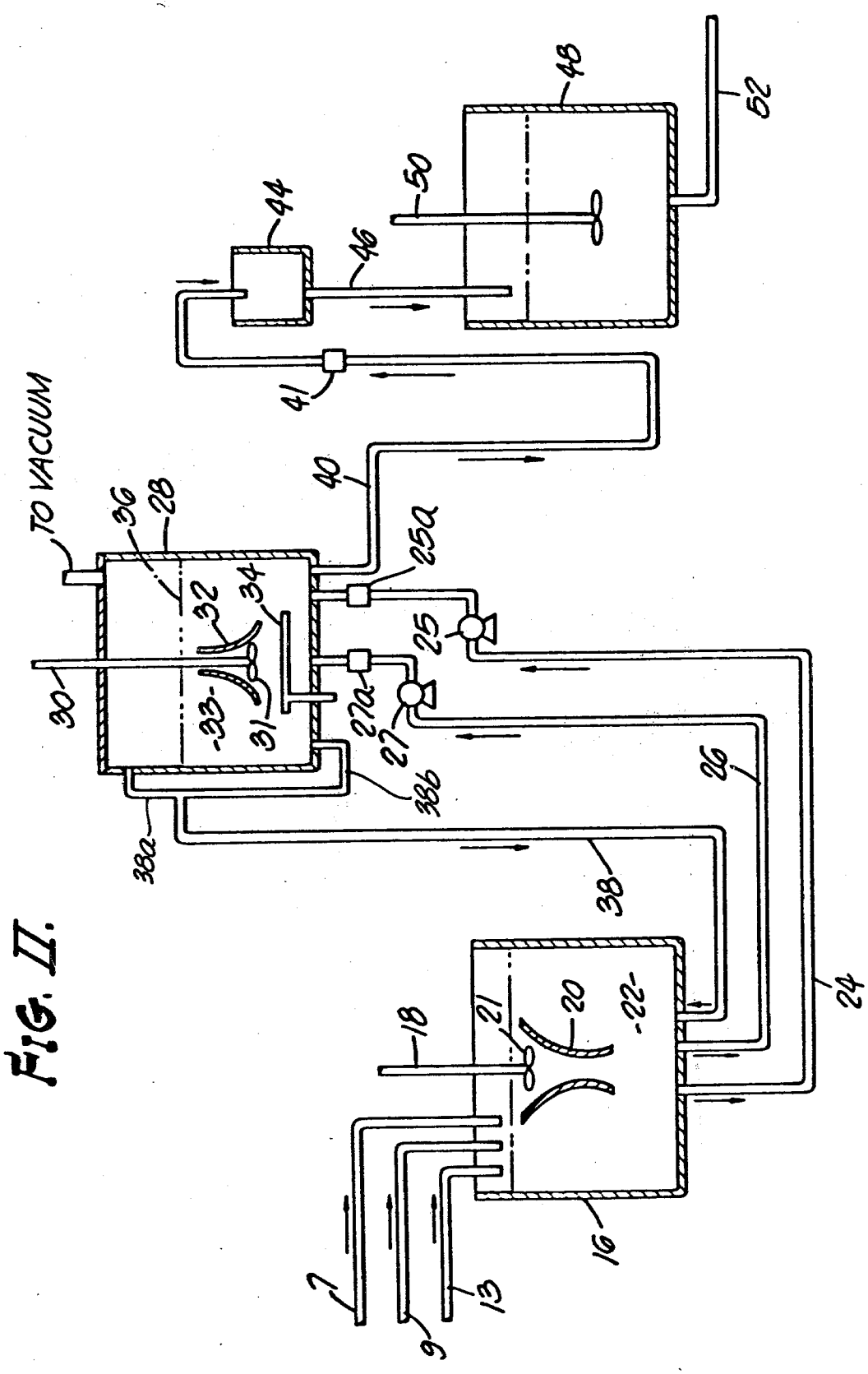
FIG. II.

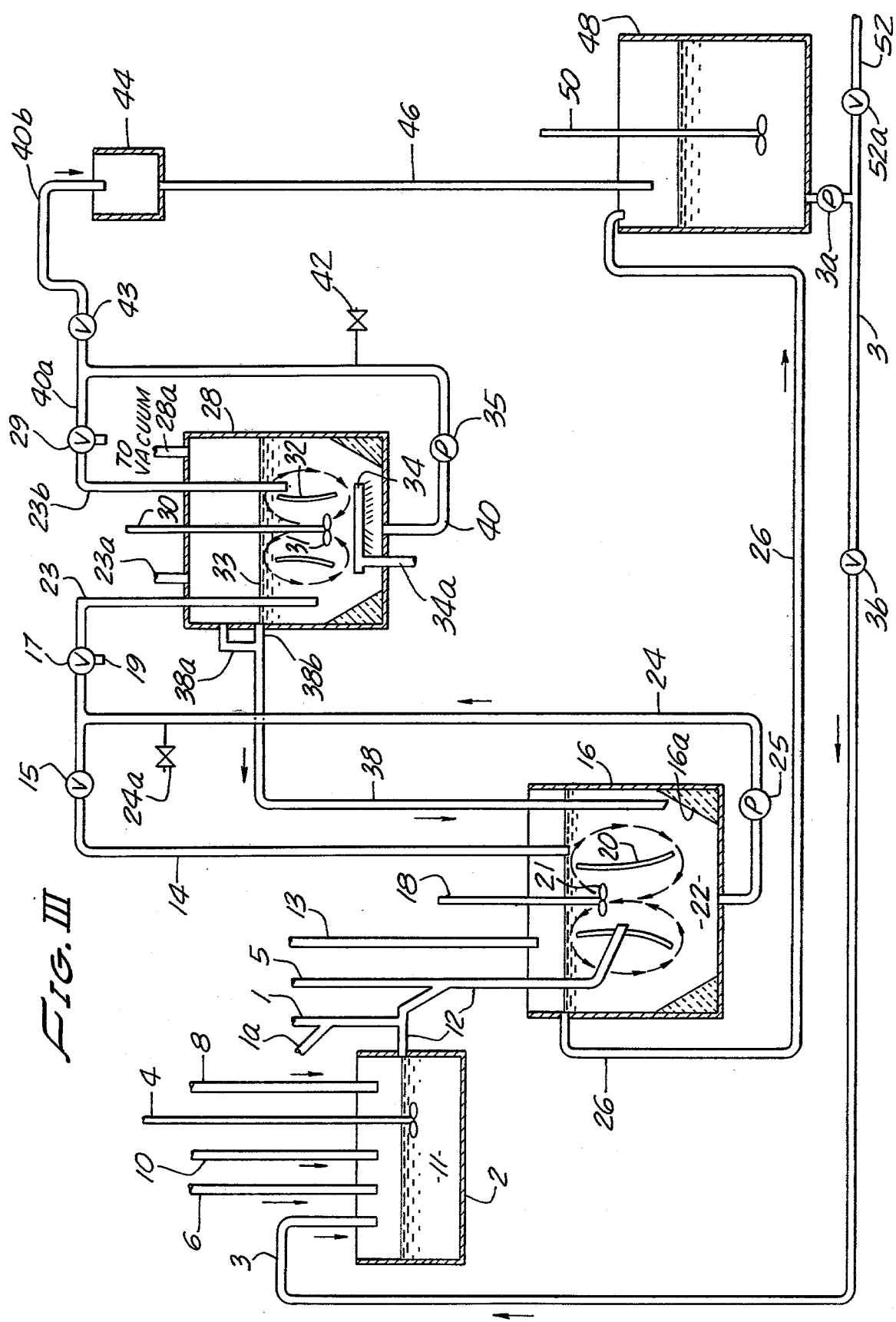

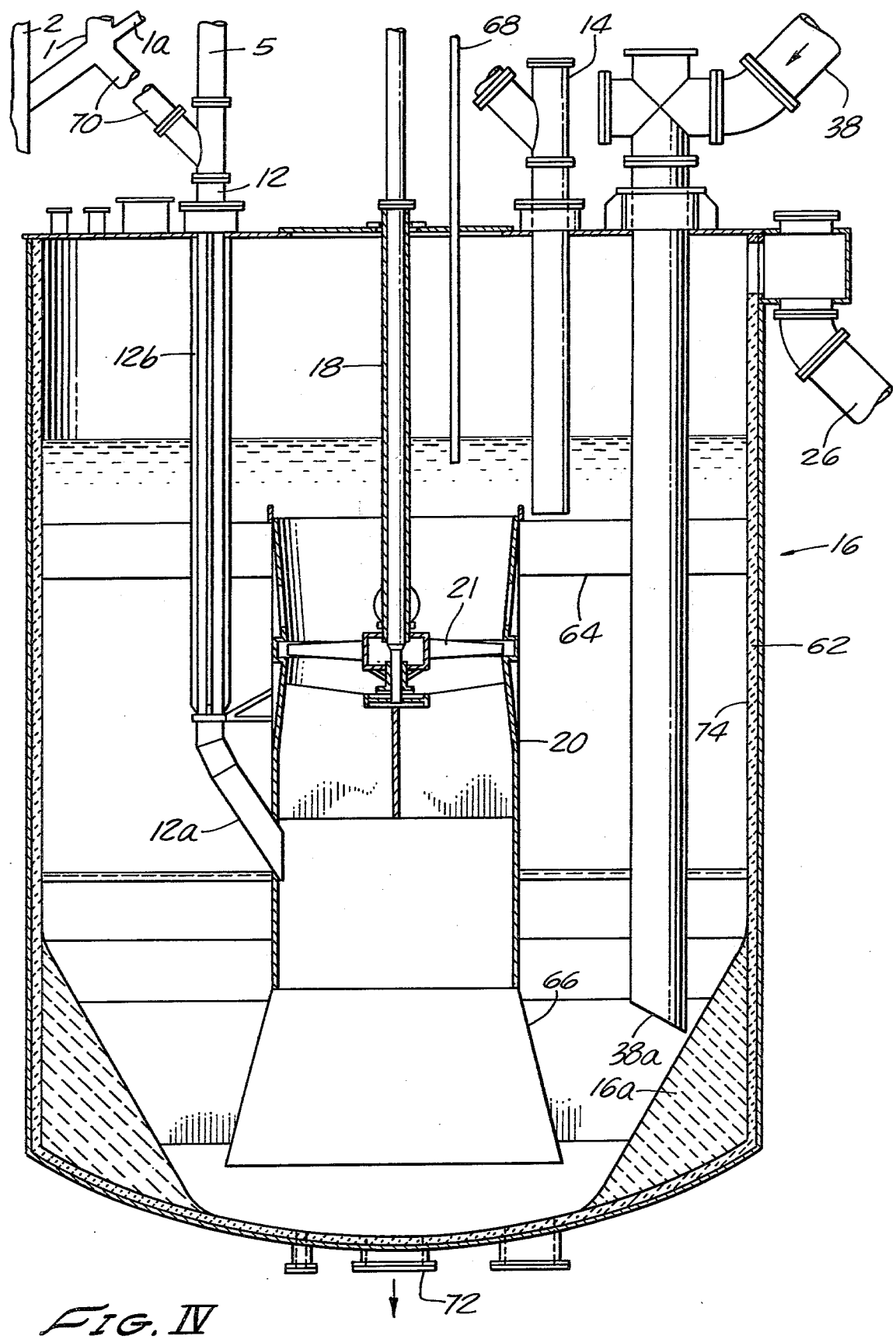
FIG. IV

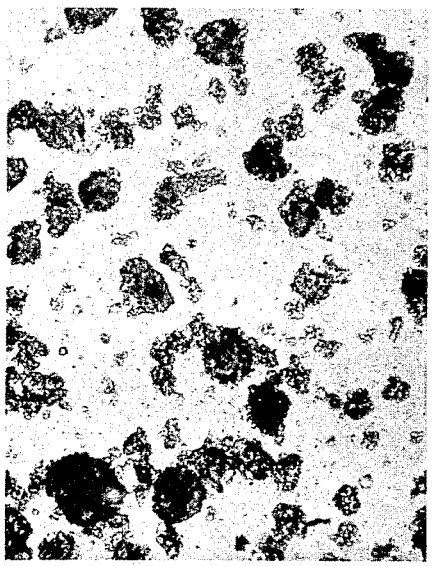
FIG. V.
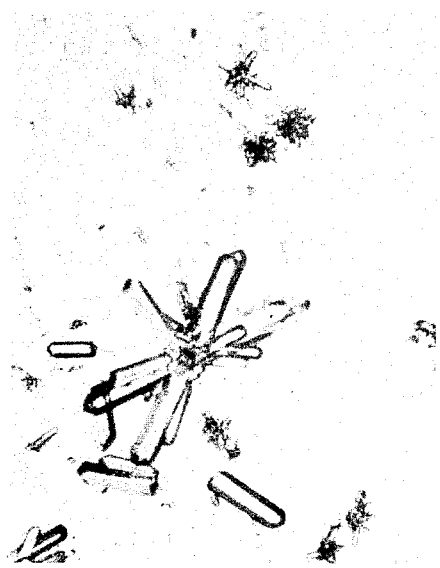
FIG. VI.
FIG. VII.
FIG. VIII.

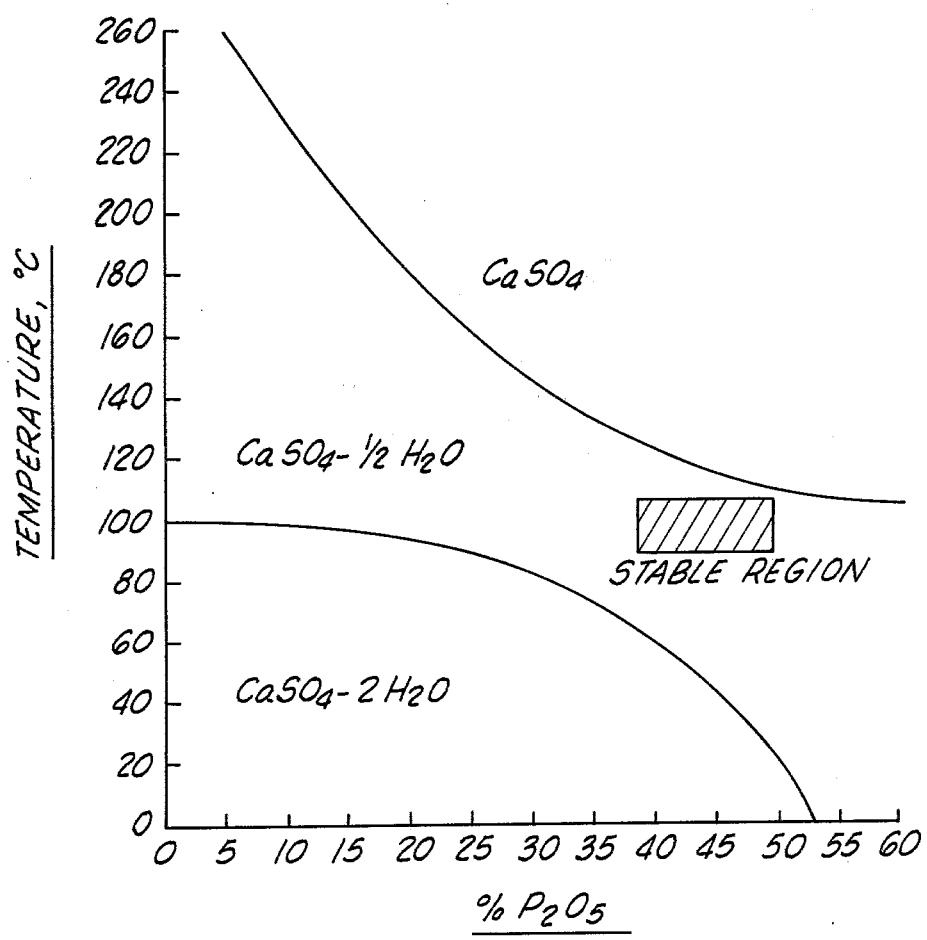
FIG. IX

HEMIHYDRATE TYPE PHOSPHORIC ACID PROCESS

CROSS REFERENCE TO RELATED APPLICATIONS

This application is a continuation in part of our applications Ser. No. 703,208—Pat. No. 4,132,760 and U.S. Ser. No. 703,138 abandoned and is related to Ser. No. 703,439, all filed July 7, 1976 (the entire disclosures of which are hereby incorporated herein by this reference). This application is also related to Ser. No. 676,559 filed Apr. 13, 1976, Ser. No. 810,848 filed June 27, 1977 and Ser. No. 840,791 filed Oct. 11, 1977 (the entire disclosures of which are incorporated herein by this reference).

SUMMARY

Phosphate rock and sulfuric acid are reacted under conditions which result in the formation of calcium sulfate hemihydrate and phosphoric acid of about 35% to about 55% $P_2O_5$. A two vessel reaction system is used in which the reaction slurry undergoes intra- and inter-vessel circulation. Preferably, the inter-vessel circulation is through a draft tube. This results in excellent dispersion of reactants and minimization of temperature and concentration gradients throughout the slurry. The solution portion of the slurry in the first vessel (the "dissolver") is preferably maintained at a negative sulfate concentration (i.e. excess dissolved $Ca^{+2}$) and the solution in the second vessel (the "crystallizer") is preferably maintained at a positive sulfate ion concentration. Also preferred is that the second vessel be maintained at a reduced pressure (e.g. to provide evaporative cooling). Better filtration rates can thus be obtained due to the favorable shape, dominant size and size distribution (especially, low fines content) of the hemihydrate crystals. Most preferred is that a crystal modifier (e.g. a sulfonic acid, a sulfonic acid salt, tall oil fatty acids or esterified tall oil, fatty acids) be present in the crystallizer.

Another unexpected benefit of the process of the present invention is that the sulfuric acid used can be less than stoichiometric, i.e., less than that required to convert the calcium content of the mineral phosphate fed to the first stage into calcium sulphate. The amount of sulfuric acid used can be in the range of 90-100% (e.g. 93-99.5%) of stoichiometric. This result should be contrasted with such teachings, for a two vessel hemihydrate process, as those of U.S. Pat. No. 3,418,077 of Robinson, issued Dec. 24, 1968, which requires an excess over stoichiometric of 0.5% to 2.0% by weight. Also relevant is the article by J. G. Getsinger, "IV Hemihydrate by the Foam Process" in Phosphoric Acid, Part 1, edited by A. V. Slack, at pages 369-382, Marcel Dekker, Inc., New York (1968), which shows a one vessel process and reports on some runs made using less than stoichiometric amounts of sulfuric acid.

The present invention is directed to the manufacture of phosphoric acid by the wet process. The hemihydrate, or as it is sometimes called, the semihydrate, process is employed to produce wet phosphoric acid from phosphate rock and sulfuric acid. Phosphate rock and phosphoric acid (which can contain $H_2SO_4$ and is preferably pre-mixed in a separate slurry tank) are added to a first reaction vessel or set of reactors, in parallel or series, (the "dissolver") which contains a first slurry comprising calcium sulfate hemihydrate, monocalcium phosphate, and phosphoric acid. The "soluble" or "excess" sulfate content (i.e., the excess or deficiency of sulfate ions over calcium ions) of the first slurry in the first reaction vessel can be maintained (e.g. by addition of sulfuric acid) at a concentration of about +0.7% to about −4% or even −8% (more preferred 0.0 to −6%), as determined for example, by the well-known gravimetric analysis. It is more preferred to be at a negative sulfate (e.g. excess $Ca^{+2}$). The sulfuric acid in the first (dissolver) vessel is usually contained in "recycle" phosphoric acid from a filtration step and/or sulfuric acid contained in a side stream or recycle slurry from the second reaction vessel. If two dissolver vessels are in series, it is preferred that slurry from the second vessel (which has an excess of $Ca^{+2}$, therefore, no free sulfuric acid) is used as the dissolution medium in the first dissolver vessel (e.g., the first vessel would be at about −6% $SO_4$ and the second vessel at about −4%, caused by addition of sulfuric acid only to the second vessel). This would greatly reduce the "lattice bound" $P_2O_5$ loss. This method of operation is the invention of James Moore, John Ellis and Gary Beer and will be the subject of a later filed application.

Sulfuric acid is added to the second reaction vessel which contains a second slurry comprising calcium sulfate hemihydrate, monocalcium phosphate, sulfuric acid and phosphoric acid. The sulfuric acid reacts with the monocalcium phosphate and any residual, undissolved phosphate rock, producing calcium sulfate hemihydrate and phosphoric acid. The soluble or excess sulfate concentration of the second slurry is maintained at a positive value (about +0.7% to about +4.5%).

Sulfuric acid is added in amounts such that the sulfate content of the added acid and the sulfate content of the added rock is equivalent to about 90% to about 100% (more preferred 93-99.5%) of the stoichiometric amount of sulfate required to react with calcium added in the phosphate rock to form calcium sulfate hemihydrate.

As is well-known in the art, sulfate and/or sulfuric acid can be introduced as such or as a part of a phosphoric acid "recycle" (as from the filtrate from filtering to separate the hemihydrate).

In order to maintain the desired soluble sulfate concentration in the first reaction vessel and in the second reaction vessel, circulation between the two reaction vessels is initiated. A first portion of the first slurry from the first reaction vessel is circulated through a first conduit into the second reaction vessel, and a first portion of the second slurry from the second reaction vessel is circulated through a second conduit into the first reaction vessel. This circulation is continuous. In order to better disperse the added phosphate rock and the added sulfuric acid within the slurry of the first and the second reaction vessels respectively and to better disperse the incoming slurry with the slurry present in the given reaction vessel, a second portion of the first slurry and a second portion of the second slurry is circulated within the first and second reaction vessels, respectively, preferably each through its own draft tube preferably at a rate equal to at least 50% of the volume of the slurry in a given reaction vessel per minute. This inter- and intra- vessel circulation disperses the reactants within the slurry in the respective reaction vessels. A third portion of the second slurry is removed from the reaction system so as to separate the liquid and solid components from the said slurry.

Although such patents as U.S. Pat. No. 3,939,248 to Caldwell and U.S. Pat. No. 2,968,544 to Zietz show the uses of draft tubes in phosphoric acid processes, these patents are not concerned with hemihydrate processes, which are well-known to involve different deposition or scaling behavior than do gypsum processes. Furthermore Zietz is concerned with contacting a crude phosphate (e.g. rock) with nitric and or nitric and sulfuric acids (phosphoric acid can also be present), which is a very different process from the crystallization of the present invention.

Although the present process has been described as involving two reaction vessels, it should be understood that additional vessels (including reaction vessels) can be useful in the process and, for example, the dissolver can comprise two or more vessels in series or in parallel.

Especially preferred is the use of an additional vessel as a slurry tank, into which phosphoric acid (which can be a filtrate, usually containing in the range of 0.5–3.5% sulfuric acid) and phosphate rock are contacted to form a slurry which is transported (as by an overflow pipe) to the dissolver vessel. In such a slurry tank, as in the dissolver, it is frequently useful to add a defoaming agent. A preferred defoaming agent comprises tall oil, tall oil fatty acids, or lower alkyl esters of tall oil fatty acids, or mixtures of such tall oil acids and esters, because such tall oil additives can also function (alone or with added sulfonics) as crystal modifiers. The preferred esters are the methyl and ethyl (as exemplified by the esters found in the commercial product marketed under the tradename AZ-10-A).

The invention also includes a system for the preparation of phosphoric acid from phosphate rock and sulfuric acid, including in combination:

a. A first reaction vessel containing a first slurry comprising calcium sulfate hemihydrate, monocalcium phosphate and phosphoric acid.

b. A second reaction vessel containing a second slurry comprising calcium sulfate hemihydrate, monocalcium, phosphate, sulfuric acid and phosphoric acid.

c. Means in each of said vessels for maintaining a continuous circulation of the slurry there in from the bottom to the top of each vessel and from the top to the bottom of said vessel.

d. A first conduit interconnecting said first and second reaction vessels for conducting said first slurry from said first reaction vessel to said second reaction vessel.

e. A second conduit interconnecting said vessels for conducting said second slurry from said second reaction vessel to said first reaction vessel, f. Means for applying a vacuum to said second reaction vessel to effect temperature control in said second reaction vessel and to from a vacuum seal between said first and second reaction vessels, g. Means for introducing phosphate rock and phosphoric acid to said first reaction vessel, h. Means for introducing sulfuric acid to said second reaction vessel, i. Means for withdrawing a slurry containing phosphoric and calcium sulfate hemihydrate from said second reaction vessel.

Preferably the system also includes a third reslurry vessel for reslurrying phosphate rock and recycle phosphoric acid, and a third conduit interconnecting said third vessel with said means for introducing phosphate rock and phosphoric acid into said first reaction vessel.

Also preferred is that said means for maintaining a continuous circulation of the slurry in each of said first and second reaction vessels includes a draft tube disposed centrally in each of said vessels and an agitator positioned axially in each of said vessels within said draft tube, whereby on actuation of said agitator the slurry in each of said vesels will flow from the bottom portion of said draft tube up through the draft tube and on exiting the top of the draft tube, the slurry will flow downwardly in the space between said draft tube and the inner wall of the vessel.

In the system said first vessel can be a dissolver vessel for essentially dissolving phosphate rock in said first slurry, said second evacuated reaction vessel being cooled by evaporation and functioning as a crystallizer vessel for crystallizing calcium sulfate hemihydrate in said second slurry, and including a fourth, filter feed, vessel, and a fourth conduit interconnecting said means for withdrawing slurry from said second reaction vessel with said fourth vessel, for conducting said second slurry containing crystallized calcium sulfate hemihydrate and phosphoric acid to said fourth vessel, and an agitator in said fourth filter feed vessel for maintaining the slurry therein in suspension.

The fourth circuit can include a surge tank, filter means and, preferably there is a rock box in said conduit for removing any relatively large rocks in said second slurry.

The system can contain a fifth conduit for conducting slurry containing crystalline calcium sulfate hemihydrate and phosphoric acid from said fourth filter feed vessel to said filter means, for filtering crystalline calcium sulfate hemihydrate from said slurry, and a sixth conduit connecting said filter with said third reslurry vessel for conducting filtrate containing phosphoric acid to said third vessel.

Preferably said second reaction vessel is positioned at an elevation higher than said first reaction vessel, said second conduit being an overflow conduit permitting return of said second slurry in said second vessel by gravity through said second conduit to said first slurry in said first vessel.

In the system, said means for introducing phosphoric acid and calcium sulfate into said first vessel can comprise an inlet pipe connected with the interior of said draft tube, and a vent connected to said inlet pipe to permit escape of gases and reduce foaming generated by the dissolving reaction in said first vessel. This and other related processes and apparatus are disclosed in later filed applications Ser. Nos. 866,990; 866,988; 866,989, and 866,987.

The system can include a sparger in the bottom portion of said second vessel below the draft tube therein, said means for introducing sulfuric acid into said second vessel comprising an inlet, said inlet being connected to said sparger. Preferably the sparger directs the acid to the bottom of the vessel.

The system preferably includes a first recirculation conduit for selectively recirculating said first slurry from said first vessel externally therof and back to said first vessel, a first pump in said first recirculation conduit, a second recirculation conduit for selectively recirculating said second slurry from said second vessel externally therof and back to said second vessel, a pump in said second recirculation conduit, and valve means for discontinuing slurry flow in said first conduit from said first vessel to said second vessel during recirculating of slurry through said first recirculation conduit or said second recirculation conduit.

Another invention of Michael Gragg and John Ellis, which can be useful in the present process and system is an apparatus for the preparation of phophoric acid from phosphate rock and a strong acid, which comprises a closed vessel, a draft tube, means connected to the inner wall of said vessel and mounting said draft tube in a vertical position within said vessel, said draft tube having an outwardly flared lower skirt portion terminating in the bottom portion of said vessel, an agitator positioned within said draft tube, a shaft for said agitator mounted axially of said vessel and extending into said draft tube, an inlet conduit to said vessel for introducing a feed slurry of phosphate rock and strong acid into said vessel, said inlet conduit having a lower end portion terminating within said draft tube, and a vent pipe connected to said inlet conduit to reduce foaming generated by the reaction in said vessel. This apparatus is claimed in commonly owned application, filed on the same day as the subject application. The entire disclosure of said application of Gragg et.,al., is incorporated herein by reference.

In another useful embodiment of the Gragg et.,al., apparatus, said inlet conduit has an elongated portion extending downwardly within said vessel, said inlet conduit having an external upper portion and an inlet portion connected to said upper portion, said feed slurry being fed into said inlet portion, and said upper portion of said inlet conduit being said vent pipe.

These features and others of the Gragg et.,al., apparatus are illustrated in the accompanying FIG. IV.

BRIEF DESCRIPTION OF THE DRAWINGS

FIG. I, Is a schematic of a preferred embodiment of the process and system;

FIG. II, shows a schematic of another embodiment of the process;

FIG. III, shows a schematic of a preferred inter- and intra- vessel flow pattern;

FIG. IV, is a cross-section of the dissolver vessel illustrating the use of a vent pipe to reduce foaming and and preferred relative positions of feed pipes in relation to the draft tube and agitator.

FIGS. V., VI., and VII., are respectively photomicrograph of the "raspberry", "jacks", and "needles" forms (or crystal habits) of hemihydrates.

FIG. VIII is a photomicrograph of a needle type habit which is very small and difficult to filter.

FIG. IX illustrates a preferred "stable region" (of temperature and %$P_2O_5$, in the calcium sulfate liquid phase) for formation of hemihydrate crystals the coordinates of the region are about 90° C., 38%; 110° C., 38%; 110° C., 50% and 90° C., 50%.

BACKGROUND AND FURTHER DESCRIPTION

The invention is directed to the production of phosphoric acid by the calcium sulfate hemihydrate process. In the present invention, compared to the prior art "gypsum processes", the control of reactant concentrations and filtration rates are improved, a concentrated phosphoric acid (about 35% to about 55% $P_2O_5$) is produced, sulfuric acid usage is reduced and a substantial reduction in electrical and heat energy consumption is realized.

Phosphoric acid has been prepared by the wet process for many years. The wet process involves the reaction of phosphatic solid materials, hereinafter termed phosphate rock, wherein calcium sulfate, monocalcium phosphate, phosphoric acid and sulfuric acid comprise the usual reaction media. The names of the three processes for the production of phosphoric acid by the wet process are based on the by-product calcium sulfate produced; namely, the gypsum or dihydrate process, the hemihydrate process, and the anhydrite process. The type of by-product is dependent upon the temperature of the system and the $P_2O_5$ concentration of the liquid phase of the slurry. Other factors such as fluorine concentration, alumina concentration, and sulfuric acid concentration play a less important role.

As is frequently illustrated by composition diagrams (plotting temperature versus acid strength), gypsum, ($CaSO_4,2H_2O$) is the by-product formed when the wet process is run at a temperature of about 90° C. or less and a $P_2O_5$ concentration of up to about 30% in the liquid portion of the slurry. Increasing the temperature to about 80°–120° C. and the $P_2O_5$ concentration to about 40% in the liquid phase will yield hemihydrate, $CaSO_4 \cdot \frac{1}{2}H_2O$. Adjusting the temperature and the concentrations, for instance, to 75° C. and 40% $P_2O_5$ results in a mixture of gypsum and hemihydrate which is very unstable. An unstable system such as this causes trouble during filtration due to the hardening or setting up of the gypsum-hemihydrate solid on the filter. Care must be exercised in maintaining the proper temperature and $P_2O_5$ concentrations in the process being run in order to avoid such problems. $CaSO_4$ anhydrite is produced at temperatures of about 130° C. and $P_2O_5$ concentrations greater than 30%. This latter process is most difficult to run due to severe corrosion at the higher temperatures and the instability of the anhydrite during processing.

The stable region in FIG. IX represents a practical region for plant-scale operation of the present invention at a good filtration rate and without encountering problems due to anhydrite or dihydrate formation.

Several problems are inherent in the production of phosphoric acids by the wet process. The degree to which these problems affect the three processes will vary due to the different operating conditions employed. The problems inherent in the hemihydrate process have heretofor prevented large scale, commercial production despite the advantage of lower energy consumption (e.g. 90% less than by gypsum method, for 50% $P_2O_5$ acid). Several problems which affect recovery and/or processing of the phosphate rock during the production of phosphoric acid are discussed below.

Phosphate values can be lost during processing of phosphate rock by several different mechanisms. The first consists of the coating of the phosphate rock with calcium sulfate. This impedes and/or inhibits the recovery of the phosphate values from the rock, hence resulting in very low yields. The second consists of substitution of calcium phosphate within the calcium sulfate lattice. The substituted phosphate values cannot be recovered by washing during the separation stage and hence pass to waste. This again results in poor recovery from the phosphate rock. The third problem involves the rapid precipitation or crystallization of many small crystals of calcium sulfate. This leads to very poor filtration and filterability.

As the $P_2O_5$ concentration of the liquid portion of the reaction slurry increases (about 28% $P_2O_5$ for the dihydrate process; about 40% $P_2O_5$ for the hemihydrate process and about 50% $P_2O_5$ for the anhydrite process), there is a great tendency to increase the substitution of calcium phosphate within the calcium sulfate crystal lattice. This results from the increase in $HPO_4^{-2}$ concentration in the liquid portion of the slurry.

In the same manner the increase in the $P_2O_5$ concentration of the liquid portion of the slurry tends to increase the viscosity of the reaction media and hence also tends to increase the amount of substitution of the phosphate within the calcium sulfate crystal structure due to reduced diffusion of the $HPO_4^{-2}$ species within the slurry. If, however, the temperature is increased, as occurs from going from the dihydrate process to the hemihydrate process, the viscosity of the reaction media is lower and hence the degree of substitution of the calcium phosphate within the calcium sulfate crystal structure is decreased. It must be recognized, however, that there are temperature limitations which must be observed for the process under consideration.

Increasing the sulfate concentration in the liquid phase of the slurry results in a decrease in the calcium ion concentration, thus tending to decrease the amount of substitution of calcium phosphate within the sulfate crystal lattice. However, care must be exercised not to increase the sulfate concentration to such an extent that the dissolution or the recovery of phosphate values from phosphate rock is impeeded by the coating of the rock with a layer of calcium sulfate. Excess sulfate concentration in the presence of high localized concentrations of calcium ions results in the precipitation of many very small crystals of calcium sulfate, resulting in a slurry difficult to filter. Thus the sulfate concentration can act both to increase the recovery of phosphate from the phosphate rock, or it can result in reduced recoveries of phosphate from the phosphate rock with attendant reduced filtration rates.

An increase in solids in the slurry will tend, in general, to increase crystal growth of the calcium sulfate formed by the reaction of calcium ions with sulfate ions. This will tend to result in larger crystals which will be more easily filterable and washable. In general, the variation of the solids content results only in very small variations in the degree of substitution of calcium phosphate within the calcium sulfate crystal lattice. In addition, it is imperative not to increase the solids to such an extent that the viscosity of the slurry is increased to such an extent that mixing becomes very difficult and localized supersaturation occurs.

The concentration of crystal modifier (whether in salt or acid form) can be far lower in the present process than in such prior art processes as described in Slack (ibid) at pages 369-386 or in U.S. Pat. No. 3,972,981.

It should also be noted that the use of a sodium organosulfonate crystal modifier in the present process does not cause an adverse increase in viscosity (contrary to what one would predict from the prior art). In fact, with an organosulfonate crystal modifier, the viscosity can be decreased, as is reported by Sikdar and Ore (one of the present applicants) in AIChE JOURNAL (Vol. 23, No. 3), pages 380-382, May, 1977.

Mixing is critical to filterability of the hemihydrate and a preferred propeller blade is of the airfoil or hydrofoil design to reduce shear and vortex formation (e.g. those marketed by Mixco). Thorough mixing is very desirable, whether running the dihydrate, the hemihydrate or the anhydrite process. Good mixing will decrease the localized high concentration of the reactants, namely, the calcium phosphate and the sulfuric acid. Decreasing such localized concentrations, results in a lowering of the substitution losses, a lowering of losses due to coating the rock and an improvement in the crystallization conditions.

However, if the mixing involves very high shear, the desirable formation of large, "raspberry" hemihydrate may not occur. It is possible that the "raspberry" habit (as illustrated in FIG. V) may be formed by growth around the needle like projections of the "jacks" habit (illustrated in FIG. VI) and that continued high shear cause these projections to break off to form "needles" (as illustrated in FIG. VII). It is also possible that improper mixing is a cause for the formation of small fine crystals which are very difficult and filter (see FIG. VIII).

Thus, it is observed that a change of one variable may favorably affect the recovery of $P_2O_5$ from phosphate rock employing one of the wet process methods and it may be detrimental to the recovery of $P_2O_5$ employing a different process. Therefore it is necessary to choose the combination of process variables which will result in the best recovery of $P_2O_5$ from the phosphate rock along with acceptable filterability of the resulting slurry for the process at hand.

The recovery of the phosphate values from the phosphate rock can be greatly increased if the agitation or mixing is maintained at a high level. Previous workers in the field have directed their energy to achieve maximum mixing in the wet process. As a result of this activity, today there are one vessel and multi-vessel systems in use for the production of phosphoric acid by the wet process. The purpose is to achieve maximum mixing so as to increase the recovery of the phosphate values from the phosphate rock and to have the best environment for dissolution of the rock and for crystallization of $CaSO_4$.

In a one vessel process, the phosphate rock and the sulfuric acid are added to the slurry in one tank. Agitators, in union with baffles, are used to circulate the slurry into which the reactants (phosphate rock and sulfuric acid) are added. To the extent that the localized concentration differences are minimized, the slurry has only one sulfate level. This is undesirable, since the phosphate rock should preferably be dissolved at a low sulfate concentration (preferably negative) whereas crystallization should occur at a high sulfate concentration.

A multi-vessel system can be of two types. Two or more compartments or cells can be constructed within one vessel, the compartments being interconnected in series. The reactants are added separately, that is, in different compartments in order to increase the dispersion of said reactant in the slurry prior to reacting with the other reactant. At the last compartment, some slurry is removed from the system for recovery of phosphoric acid; the major portion of the slurry being recycled to the first compartment.

Multi-vessel processes involve the use of two or more vessels connected in series, the reactants are added to the slurry in separate vessels so as to more completely disperse one reactant in the slurry before it is contacted by the later added reactant(s). Again the system is arranged so that a portion of the slurry is recycled from a later reactor back to the first reactor.

The reaction between sulfuric acid and phosphate rock is exothermic. In order to control the temperature of the reaction system, provisions must be made to remove this excess heat. Previously this has been accomplished by (1) blowing air through the slurry or (2) pumping a portion of the slurry to a vessel under vacuum or (3) conducting the operation in a vessel under vacuum.

The use of air as a coolant is not too desirable because it is necessary to scrub large amounts of air exiting the system to remove pollutants, mainly fluorine in the form of hydrogen fluoride or silicon tetrafluoride. The equipment required is quite expensive.

When a portion of the hot slurry is removed from the main body of the slurry, and subjected to vacuum, cooling occurs by the evaporation of water (U.S. Pat. No. 2,699,985). The cooled slurry is then added to the main body of the hot slurry and moderates the temperature of the process.

The method of conducting the reaction under vacuum has many desirable features. The cooled slurry is immediately dispersed within the hot slurry and temperature differentials within the slurry are minimized. The slurry is concentrated by the removal of water, and the desired temperature is easily maintained.

The above described multi-compartment and multi-vessel systems improved on dispersing the reactants to some extent, however, greater dispersion of the reactants is desirable in order to improve the dispersion of the reactants in a one vessel reactor. Caldwell, U.S. Pat. Nos. 3,416,889 and 3,939,248 and Bergstrom, U.S Pat. Nos. 3,666,143 and 3,917,457 developed a combination reactor-cooler which is fitted with a draft tube. The vessel was maintained under a vacuum while the slurry was circulated within a vessel. Using the draft tube with an agitator it is possible to circulate the slurry at such a flow rate that upwards of 200% of the volume of the slurry is circulated through the draft tube per minute, constantly renewing the surface of the slurry exposed to the vacuum. With this type of circulation, dispersion of the reactants is improved over the conventional one vessel system. In addition to better dispersion of the reactants, the slurry on exposure of the vacuum at the surface is cooled by evaporation of water. The temperature differential within the system is minimized by the rapid flow rate realized. The cooled slurry is immediately mixed with the hot slurry minimizing the localized cooling affect.

Lopker, U.S. Pat. Nos. 3,522,003 and 3,522,004 describes the use in a gypsum process of a two vessel system for the production of phosphoric acid from phosphate rock and sulfuric acid. These patents show the two vessels connected in series, at least one of which is under vacuum. The vacuum applied to one vessel cools the slurry by evaporation of water. The cooled slurry is then rapidly dispersed within the system minimizing cooling effects and preventing supersaturation of the calcium sulfate due to reduced temperatures. The levels of the slurries within the two vessels are vertically offset.

Sulfuric acid, phosphoric acid, phosphate rock or a mixture of phosphoric acid-phosphate rock can be added to the slurry in different vessels. The reactants are mixed in the vessel and are circulated from one vessel to another. In this way, localized, high concentrations of the added reactants are minimized. Good recovery of $P_2O_5$ values from the rock are realized. Better filtration rates are also obtainable due to the retardation of the formation of excessive number of very small calcium sulfate crystals resulting from supersaturation.

Processes for the production of phosphoric acid by the hemihydrate process are well known in the art. A. V. Slack, in "Phosphoric Acid" Part One, Marcel Dekker, Inc., New York, 1968, describes hemihydrate process. The problems encountered are observed in filtering the hemihydrate slurry and the high degree of substitution of phosphate in the calcium sulfate lattice. Attempts to overcome the deficiency in filtration rate and poor $P_2O_5$ recoveries while maintaining the production of phosphoric acid containing about 40% $P_2O_5$, resulted in the development of a hemihydrate-dihydrate system. U.S. Pat. Nos. 3,472,619 and 3,552,918 are representative of the systems employed.

These patents describe the preparation of phosphoric acid by the hemihydrate process, recovering said phosphoric acid from the solid $CaSO_4.\frac{1}{2}H_2O$, recrystallization of $CaSO_4.\frac{1}{2}H_2O$ to $CaSO_4.2H_2O$, and the recovery of phosphoric acid liberated during the recrystallization of $CaSO_4.2H_2O$. Apparently, the best of both processes is achieved. High concentration, about 40% $P_2O_5$ acid is recovered while low losses in the filter cake are observed as the result of the recrystallization of the $CaSO_4.\frac{1}{2}H_2O$.

Fitch (U.S. Pat. No. 3,553,918) describes a process for the production of concentrated phosphoric acid and gypsum including the acidulation of phosphate rock in a first zone in which the resulting slurry contains from about 1% ($-2.45\%$ $SO_4^=$) to about 4.5% ($-11\%$ $SO_4^=$) excess calcium. The slurry produced in the first zone is then transferred to a second zone in which an excess of sulfuric acid is present such that from about 3% to about 6% excess sulfuric acid is present in the slurry. Hemihydrate initially produced is converted to gypsum.

Peet (U.S. Pat. No. 3,885,263) describes an anhydrite process and Long (U.S. Pat. No. 3,453,076), Peet (U.S. Pat. No. 2,885,264) and Robinson (U.S. Pat. No. 3,418,077) describe processes for the production of phosphoric acid by the hemihydrate process. No additional recrystallization of the $CaSO_4.\frac{1}{2}H_2O$ is required in these hemihydrate processes. In the Robinson process phosphoric acid containing from about 40% to about 55% $P_2O_5$ by weight is produced. This process comprises in a first stage reacting in the presence of excess calcium ions, phosphate rock with at least nine parts by weight of phosphoric acid for each part of calcium added, said phosphoric acid containing at least 37% by weight $P_2O_5$ and 1% to 3% by weight dissolved sulfate, whereby the phosphate rock is converted into a slurry comprising monocalcium phosphate, phosphoric acid, and calcium sulfate, the percentage of calcium ion precipitated as calcium sulfate being 10 to 60%, preferably 20-50% by weight of total calcium fed, in a second stage reacting the slurry from the first stage with sulfuric acid whereby phosphoric acid containing at least 40% $P_2O_5$ by weight and calcium sulfate hemihydrate is formed, the sulfuric acid being used in an amount 0.5 to 2.0% by weight in excess of that required to convert the calcium content of the phosphate rock fed to the first stage into calcium sulfate. In the third stage, the phosphoric acid is separated from the calcium sulfate and the crystals are washed. The temperature of the first and second stages are in the range from 80° to 111° C., preferably from 90°–110° C.

DETAILED DESCRIPTION

This invention is directed to a process for the production of phosphoric acid by the calcium sulfate hemihydrate process.

A major element of the present invention is that the stream or slurry (comprising phosphoric acid and calcium sulphate hemihydrate) which is passed through the separation section (e.g. a filter), has a beneficially low content of fines (i.e. solids with an average particle diameter less than about 5 microns) and a low viscosity, especially when an organic sulfuric acid or organic sulfuric acid salt is added as a crystal modifier at a concentration in the range of 1–1000 ppm, more preferred 5–100 ppm, by weight based on the total weight of the slurry transferred to the separation section.

For production of phosphoric acid in a large scale commercial plant, it is essential that the stream to the filter have a high filtration rate, preferably at least 0.2 tons $P_2O_5$/day ft$^2$ (more preferred at least 0.5). Typically, the stream to the filter in the present process has a filtration rate of at least 0.6 tons $P_2O_5$/day-ft$^2$ and has about at least as fast a filtration rate as does the usual stream to the filter from a Prayon type gypsum process utilizing the same rock, water, sulfuric acid, etc. (yet at a significantly higher $P_2O_5$ concentration in the product acid, e.g. 28% for gypsum versus 42% for the hemihydrate).

The filter rate can be calculated as shown hereinafter.

One way to determine filtration rates is to measure the time required for passage of liquid through a filter including (1) cake forming (2) a first wash (3) a second wash and (4) water wash. In this method dead time is allowed for cake dry time or laspe time between washes.

The conditions in addition to the above can include 30 seconds for cake drying and 5 seconds lapse time after cake forming and the two acid washes, that is a total of 45 seconds.

A computer program can be drawn to correct the raw data to a set of standard conditions, namely:
Cake thickness—1.25″
Dead time—None
$P_2O_5$ yield—100%
Wash water to dry cake ratio—1.022
Cake dry time=0
Lapse time between washes=0

The filter rate (R) can be expressed as:
R=tons $P_2O_5$/day ft$^2$

The filter rate (T $P_2O_5$/day ft$^2$) Can be multiplied by the active (under vacuum) filter area (here 1170 ft$^2$) to obtain filter capacity as follows:

$$T\,P_2O_5/day = \text{rate}\left(\frac{\text{tons }P_2O_5/day}{ft^2}\right) \text{area (ft}^2\text{)}$$

This equation makes no allowance for pressure correction (e.g. vacuum).

With the above information the maximum filter capacity can be determined. Operating the filter at maximum speed (e.g. 2.8 min./rev.) gives the minimum cake thickness and hence the maximum filter rate.

Following the above equation and making the appropriate correction the relationship is:

$$\frac{\text{Tons }P_2O_5}{\text{Day}} = R\,K_1\,K_2\,K_3\,1170 = T/D$$

R=Filtration rate from filter test, tons $P_2O_5$/day ft$^2$, at the design conditions imposed on the computer program.
$K_1$=Time ratio correction, which in one set of runs was ATT (sec)
$K_1$=ATT+5 sec+dry time (sec)

ATT=adjusted total time w/o dry time or lapse time between washes in seconds.
$K_2$=Pressure correction. This may be employed to correct the filtration rate from experimental conditions to an operating condition.

$$K_2 = \frac{\text{operating vacuum}}{\text{experimental vacuum}}$$

$K_3$=Cake thickness correction factor $$K_3 = \frac{\text{computer specified thickness (in.)}}{\text{operating cake thickness (in.)}}$$

$$K_3 \text{ (for hemi)} = \frac{\text{computer specified thickness}}{0.00099 \text{ (min./rev.) } T/D}$$

$$K_3 \text{ (for di)} = \frac{\text{computer specified thickness}}{0.00139 \text{ (min./rev.) } T/D}$$

The above equation now becomes:

$$(T/D)^2 = R\,K_1\,K_2\,\frac{\text{computer cake thickness}}{0.00099 \text{ (min./rev.)}}\,1170$$

$$(T/D)^2 = R\,K_1\,K_2\,\frac{\text{computer cake thickness}}{0.00139 \text{ (min./rev.)}}\,1170$$

By using the maximum filter speed 2.8 min./rev. and corresponding dry time in these equations the maximum filter capacity (T $P_2O_5$/day) for a commercial filter of 1170 ft$^2$ under vacuum, can be calculated.

It should be noted that the following relation applies to cake dry time. The following table illustrates the relationship between filter speeds and drying times:

| Filter speed min./rev. | Time in cake dry zone (sec.) |
|---|---|
| 2.8 | 19.2 |
| 3.33 | 23.3 |
| 4.00 | 28.0 |
| 4.50 | 31.5 |

Intermediate filter capacity can be determined by using a slower filter, hence a thicker cake.

Another very important factor is that the hemihydrate crystals in the feed to the filter in the present process has a fairly uniform particle size distribution and are in the "raspberry" crystal habit or form and have a very low fine content (as illustrated by the photomicrograph in the accompanying FIG. V).

FIG. VI is a photomicrograph of a more usual (especially where there are no impurities in the environment e.g., Fe Al, Mg, fluoride, $SiF_4^{-2}$) "jacks" type of calcium sulfate hemihydrate crystal habit (which may be a precursor of the raspberry crystal).

FIG. VII shows a "needle" form of calcium sulfate hemihydrate crystal habit. The FIG. VII crystals may possibly be formed by fission from the "jacks" type habit (e.g. by high shear agitation).

FIG. VIII is a photomicrograph of a very poor small needle type crystal habit which is very difficult to filter due to the high proportion of fines.

It should be noted that when operating the invention as described herein filtration has been very good; however, on some occasions solids have built-up and caused buckling of the filter elements, probably due to loss of sulfate control.

Phosphate rock, either calcined or uncalcined, and phosphoric acid are added to a first slurry comprising phosphate rock, calcium sulfate hemihydrate, monocalcium phosphate, phosphoric acid and sulfuric acid. Preferably, the phosphate rock is slurried in the phosphoric acid prior to the addition to the first slurry. Phosphate rock, about 95% of +100 mesh, containing at least 32% $P_2O_5$ is the preferred source of phosphate for the process. Ground or unground rock can be used. For example, phosphate rock of 95% of −200 mesh can be used. Rock containing less than 32% $P_2O_5$ is acceptable, and can be employed in this process. High alumina phosphate pebble may also be used, especially when the resulting acid is purified by the process of U.S. application Ser. No. 676,559 filed 4-13-76 of Ore, the entire disclosure of which is hereby incorporated herein. The phosphate rock is slurried in phosphoric acid that contains from about 20% to about 40% $P_2O_5$. Phosphoric acid, recycled from the separation section, containing from about 20% to about 40% $P_2O_5$ (and usually some sulfuric acid) is usually used in the process. When the phosphoric acid is recycled from the separation section it will usually contain from about 0.5% to about 3.5% sulfuric acid by weight. Phosphoric acid from other sources, such as other phosphate plants, merchant grade acid may be used.

The temperature of the phosphate rock-phosphoric acid mixture is maintained at about 50° C. to about 100° C., preferably from about 90° C. to about 100° C. The resulting mixture is from about 30% to about 40% solids by weight, about 33% being preferred. A defoamer is added if and when required. Calcination of the rock can reduce or eliminate foaming. Various antifoam agents can be used, including tall oil, tall oil fatty acids, alkyl esters and part esters of tall oil fatty acids, sulfated tall oil fatty acids, tall oil rosin, alkoxide adducted tall oil rosin, oleic acid, sulfated oleic acid, silicones, reaction products of amines and carboxylic acids and mixtures of two or more of such defoamers.

The phosphate rock-phosphoric acid mixture is added to a first slurry of calcium sulfate hemihydrate, phophoric acid, monocalcium phosphate and sulfuric acid in a first reaction vessel. The phosphate rock and phosphoric acid may be admixed in a separate vessel or added separately to the first slurry in the first reaction vessel. The phosphate rock-phosphoric acid mixture on being added to the first slurry in the first reaction vessel is rapidly dispersed within the first slurry. A first portion of the first slurry is transferred to a second reaction vessel.

The first reaction vessel is fitted with a draft tube and an agitator (although the draft tube can, in some cases, be removed). The agitator can consist of a shaft fitted with a propeller at the bottom thereof. The agitator is so located with respect to the draft tube that on activation of the agitator, a second portion of the first slurry is drawn from the bottom of the draft tube up through the draft tube and out the top of the draft tube. On exiting the draft tube said slurry passes in a downward direction in the space between the draft tube and the walls of the first reaction vessel. The direction of circulation through the draft may be reversed and is not critical. In this first or dissolver vessel (or set of vessels), considerable gas ($CO_2$) is generated and, like a giant milkshake, the apparent density of the contents can be about 1.0, although when the gas is removed, the actual density of the contents is about 1.6 to 2.0.

Circulation is thus established within the first reaction vessel. The rate at which said slurry is circulated is at least equal about 50% of the volume of the slurry in the first reaction vesel per minute, preferably from about 50% to abut 150% and most preferably about 100%. This circulation thoroughly disperses the phosphate rock-phosphoric acid mixture within the first slurry. The recycle phophoric acid dissolves the $P_2O_5$ in the rock forming monocalcium phosphate. This is an exothermic reaction which suplies the heat required to maintain the temperature of the slurry in the first reaction vessel between about 66° C. to about 113° C. The soluble or "excess" sulfate content of the first slurry is typically maintained at about +0.0% to about −4%, (but, depending on the method of sulfate analysis, the soluble sufate can be as low as −7, below which the rock dissolution practically stops due to saturation of calcium phosphate). The first slurry, whether in one or a plurality of reactors is maintained at an excess of $Ca^{+2}$ (a deficiency of $SO_4^{-2}$) for stoichiometric formation of $CaSO_4$.

The temperature and $P_2O_5$ content in the dissolver vessel and especially in the crystallizer or second vessel, are preferably within the region shown on the striped rectangle labeled "stable region" in the accompanying FIG. IX, titled "Hydrates of $CaSO_4$ Precipitated VS % $P_2O_5$ and Temperature".

As measured, soluble sulfate values can be either positive or negative. Soluble sulfate values include not only the sulfuric acid present in the liquid component of the slurry but also the soluble calcium sulfate there present. Negative soluble sulfate values indicate that excess of calcium ions are present in the solution, as is usually observed in the phosphate rock-phosphoric acid mixture. Positive soluble sulfate values indicate that excess sulfate ions are present. A value of 0.0% indicates that the sulfate ions and the calcium ions are equivalent stoichiometrically within the limits of the analysis.

One typical analysis is 0.9% CaO and 2.2% $SO_4$ which would calculate $$0.9 \frac{96 \text{ (M.W. } SO_4)}{56 \text{ (M.W. CaO)}} = 1.54 \, SO_4 \text{ equivalent to CaO.}$$

This leaves 2.2−1.5=+0.7% "free or soluble" sulphate.

That is, a positive soluble sulphate.

Another analysis is 0.98% CaO and 1.4% $SO_4$, which calculates $$0.98 \frac{96}{56} = 1.7 \text{ sulphate equivalents from the CaO 1.4−1.7 =}$$

$$-0.3\% \text{ soluble sulphate.}$$

That is, there is insufficient sulphate concentration to combine with all of the calcium, which is reported as a negative value.

As is described further hereinafter, the numerical value of negative sulfate can vary somewhat depending on the analytical procedure for sulfate ions. For positive sulfate values, there is little or no difference between values obtained by different analytical methods. The preferred method of calcium analysis is by atomic absorption, which is highly accurate for both positive and negative sulfate.

The residence time of the solids in the first reaction vessel is from about 2.0 hours to about 5.0 hours, preferably from about 2.5 hours to about 4.5 hours.

A first portion of the first slurry is transferred through a first conduit into a second reaction vessel. The second reaction vessel, which is preferably subjected to a vacuum, is fitted with a draft tube, an agitator and a sulfuric acid inlet. The agitator consists of a shaft fitted with a propeller at the bottom thereof. The shaft and agitator are so located with respect to the draft tube that on actuation of the agitator a second portion of the second slurry is caused to flow from the bottom of the draft tube up through the draft tube and out the top of the draft tube. On exiting the draft tube, said second portion of the second slurry flows in a downward direction in a space between the draft tube and the inside walls of the second reaction vessel. The direction of the circulation can be reversed and is not critical. The rate at which the slurry is circulated is at least equal to about 50% of the volume of the slurry in the vessel per minute, preferably from about 50% to about 150% of the volume and most preferably about 100% of the volume. Sulfuric acid, preferably about 98%, is added through the sulfuric acid inlet into the second slurry either as is or mixed with phosphoric acid. The first portion of the first slurry is also added into the second slurry.

A crystal modifier, usually a derivative of tall oil or of an organic sulfonic acid, preferably a salt, can be added to the slurry in the second reaction vessel. The crystal modifier can also be added to the first reaction vessel. A preferred crystal modifier is selected from alkyl, aryl, alkylaryl, and acyclic derivatives of sulfonic and sulfuric acids in which the organic radical contains from about 12 to about 30 carbon atoms. The free acid, salts thereof and mixtures of the free acid and salts may be used. The preferred salts include those of alkali metals, ammonia and alkyl, aryl or alkylaryl amines (e.g. trimethyl amine, diethyl amine, monopropyl amine). Polymeric sulfonates and sulfates can also be employed. Examples of crystal modifiers which can be employed in the present process are alkyl sulfonic acids containing from about 12 to about 30 carbon atoms, benzenesulfonic acid, alkylbenzenesulfonic acid in which the alkyl group contains from about 8 to 20 carbon atoms, alkylcyclohexane sulfonic acid in which the alkyl group contains from about 8 to 20 carbon atoms, polymeric sulfonates and sulfates such as polystyrene sulfonate, and polyvinylsulfonate, said polymeric material having a molecular weight of from about 500 to about 1,000,000. The organic sulfonic acid can be an alkyl-,aryl-,or an alkylaryl-sulfonic acid or a sulfated derivative of a carboxylic acid or an alkali metal, amine or ammonium salt thereof. For example, tetradecylsulfonic acid, benzene-sulfonic acid, isooctylbenzene sulfonic acid and sulfated oleic acid may be used as crystal modifiers in this process. Mixtures of two or more modifiers are also useful. The crystal modifier is added for the purpose of increasing the growth of the hemihydrate crystals formed in the system. The preferred salts include those of sodium, potassium, ammonia and primary, secondary and tertiary alkyl amines containing from 1 to about 30 carbon atoms. Preferably, the modifier as described above, is present at a level of about 1 to 1000 ppm (usually 5 to 500 ppm) based on the weight of slurry to the separation section. Preferably, the levels of modifier and of defoamer are kept as low as possible (while maintaining good filterability), since residual quantities in the phosphoric acid product can cause crud formation (e.g., emulsions and deposits) if the acid is later treated to remove magnesium impurities by the process of U.S. patent application 688,265 filed May 20, 1976 (which is incorporated herein) and the related processes in U.S. Ser. No. 840,791 filed Oct. 11, 1977.

An unexpected discovery is that salts of sulfonic acids can be used as crystal modifiers in the process of the present invention without causing an adverse increase in solution viscosity. This result is surprising, in view of the teaching in Slack, Phosphoric Acid, M. Deckker, Inc., New York, 1968 (at page 383), "Neutral surfactants, such as a salt of ABS, have an adverse effect on slurry viscosity".

The flow of the second slurry within the second reaction vessel thoroughly disperses the first portion of the first slurry, the sulfuric acid and the crystal modifier within the second slurry. The location of the sulfuric acid inlet in the second reaction vessel is not critical. It may be at the top, the middle, the bottom or at intermediate points of the second reaction vessel. The sulfuric acid conduit attached to the sulfuric acid inlet may enter the second reaction vessel from the top, the bottom, or points intermediate therein, the exact point of entrance into the vessel is not critical.

Phosphoric acid, if needed, can be added to the second slurry within the second reaction vessel.

The surface of the second slurry in the second reaction vessel is preferably exposed to a pressure of between about 2 to about 29 inches of mercury absolute, more preferably from about 3 to about 20 inches mercury absolute. Water and volatile components added to, or produced in, both the first and second slurries can be removed from the second slurry by evaporation causing a reduction in the temperature of the second slurry. The cooled second slurry is thoroughly mixed so that temperature differentials are minimized within the total volume of the second slurry. With this evaporative cooling, the temperature of the second slurry is maintained between about 66° C. to about 113° C. preferably from 80° C. to about 105° C. Although it is greatly preferable to operate the second vessel under reduced pressure, the process can be run while maintaining both the first and second reaction vessels at atmospheric pressure. Sulfuric acid, which is added to the second slurry in the second reaction vessel through the sulfuric acid inlet, can be from about 89% to 99% $H_2SO_4$, typically about 98% $H_2SO_4$.

The total sulfate value added to the system is the sum of the sulfate values in sulfuric acid added plus the sulfate values added in the rock. Surprisingly in the present process this total can be only about 90% to 100% of the stoichiometric amount of sulfate needed to convert the calcium added in the rock fed to the first reaction vessel into calcium sulfate hemihydrate. Table 1 herein is a compilation of such sulfuric acid usage. Listed are the tons per day (TPD) of phosphate rock fed, % CaO in the rock, % $SO_4^=$ in the rock, CaO fed (TPD), stoichiometric sulfate for the calcium in the rock (TPD), sulfate in sulfuric acid fed to the unit (TPD, sulfate equivalent in the rock (TPD), the total sulfate used (TPD), and total sulfate used as a fraction of the stoichiometric amount of sulfate required for the calcium in the rock.

The soluble sulfate content as measured in the second slurry should be from about +0.7% to about +4.5%, preferably from about 1.5% to about 3.0%. The specific gravity of the slurry in the second reaction vessel is about 1.80%±0.2 g/cc. The specific gravity of the liquid portion of the slurry is about 1.56±0.20 g/cc. The liquid gravity corresponds to a phosphoric acid which contains about 44%±10% $P_2O_5$. Residence time of the solids in the second reaction vessel is from about 0.6 hour to about 2.0 hours, preferably from about 0.7 hour to about 1.6 hours.

The excellent mixing obtained with this system is achieved using approximately 1/16 of the horsepower required for a comparable wet process gypsum type phosphoric acid plant such as a Dorr-Oliver or a Prayon Plant.

A first portion of the second slurry flows from the second reaction vessel back to the first reaction vessel through a second conduit and is thoroughly dispersed within the first slurry.

It is the flow of the second slurry to the first slurry which aids in controlling the temperature of the first slurry and adds sulfate values (sulfuric acid) and phosphoric acid values to the first slurry in order to dissolve the rock. Additional sulfate values are usually added to the first slurry in the first reaction vessel with the recycled phosphoric acid. Circulation between vessels and within vessel minimizes localized concentration of reactants of hot slurry and of cooled slurry thus resulting in a more easily controlled process than previously observed.

A third portion of the second slurry is removed from the second reaction vessel and is transferred through a conduit to a reservoir. The third portion of the second slurry, on a weight basis, is approximately equal to the phosphate rock, the phosphoric acid, and the sulfuric acid added in the first and second reaction vessels respectively minus the volatiles (on a weight basis) removed from the second reaction vessel which can be subject to a vacuum. The third portion of the second slurry.

For plant control purposes, the flow rates of the reactants and of the slurries can be adjusted in accordance with the analytical values obtained in order to maintain the desired sulfate levels within the reaction system. It is to be understood that the system described can be run on a batch or continuous basis (wherein the reactants can be continuously added and the third portion of the second slurry can be continuously removed from the system prior to separation into phosphoric acid and calcium sulfate hemihydrate).

A defoamer is added if and when required. The defoamer may be selected from the group consisting of tall oil rosin, alkoxylated tall oil rosin (see U.S. Pat. No. 3,594,123, issued July 20, 1971 to Encka et al), tall oil fatty acids, whole or part esters of tall oil fatty acids, sulfated tall oil fatty acids, alkoxylated tall oil fatty acids, oleic acid, sulfated oleic acid, silicones and mixtures of a monocarboxylic acid (12–22 carbon atoms) and monoalkanoylamide derivatives of the monocarboxylic acid. The preferred defoamer is a mixture of methyl esters of tall oil fatty acid and tall oil fatty acids sold by AZ Products Co. of Eaton Park, Florida under the tradename "AZ 10A" (because AZ 10A also acts as a crystal modifier). The crystal modification is not due entirely to the presence in AZ 10A of a sodium alkyl sulfonate because crystal modification also occurs when the sulfonate is removed. The amount of the defoamer used is preferably from about 0.01% to about 0.3% (typically 0.04 to 0.1) by weight based on the weight of the slurry transferred to the separation section (or about 0.05% to 1.5% based on $P_2O_5$ produced by the process).

As is noted hereinafter, venting of the reslurry and/or dissolver vessels can reduce defoamer usage.

Although AZ 10A is a proprietary product, analytical data (infra-red spectroscopy and hydrolysis) show that it comprises a mixture of carboxylic acids and esters. Elemental analysis yielded the following composition: C, 78.70%; H, 11.59%; N, 0.52%; S, 0.20%; O (by difference), 9.54%. This indicates that AZ 10A is not a sulfonate, however, further study showed that the AZ 10A contained about 1% by weight of a sodium salt of an alkyl sulfonic acid. The nitrogen is probably contained in the tall oil. The major fraction, b.p 120–170 at 0.35 mmHg is a mixture of carboxylic acids and carboxylate esters. Gas chromatographic analysis of this fraction indicates a group of components with retention times in the vicinity of methyl oleate. (One of these has the same retention time as methyl oleate on two different columns.)

| Fractional Distillation (225g Pot Charge) | | | |
|---|---|---|---|
| Frac. # | b.p °C./mmHg | % of Charge | Identification |
| (trap) | <50° C./.30 | 4.8 | 13 components |
| 1 | 50–75/.30 | 2.6 | 12 components |
| 2 | 75–120/.35 | 6.0 | 13 components |
| 3 | 120–170/.35 | 44.8 | esters and acids |
| 4 | 170–195/.40 | 9.6 | Acids, eq.wt 292 |
| P.R. | >270° C./0.5 | 28.9 | Tarry, High M.W. Esters & Alcohols |

Basic hydrolysis of Fraction 3 yields a new component with the same g.c. retention time as methanol. This component is also present in a water extract of AZ 10A along with a component whose retention time is identical to ethanol. Both components increase on basic hydrolysis of AZ 10A, while only the methanol peak is present in the fraction 3 hydrolyzate.

Gas chromatographic examination of water extracts of the hydrolyzates of both Fraction 3 and AZ 10A failed to indicate the presence of any other alcohols. The elemental analysis of AZ 10A indicates a C/O atomic ratio of 11. This ratio is approximately what one would expect from an impure mixture of $C_{18}$ and $C_{20}$ acids and their lower alcohol esters.

The tarry pot residue was not completely characterized. Its infrared spectrum indicates the presence of high molecular weight alcohols and esters. Such components are expected in tall oil pitch (the high boiling tarry material separated in tall oil fractionation).

Therefore, AZ 10A contains a partially esterified crude tall oil. Methanol is the esterifying agent. It did not appear to contain condensation products at ethylene oxide because no evidence of ethylene glycol was found in the water extracts or the hydrolyzates. While this did not rule out this possibility, the hydrolysis results combined with the high C/O ratio by elemental analysis did indicate that only a small amount of ethylene oxide products can be present. It was later discovered that AZ 10A contains about 2–3% of a non-ionic surfactant derived by reacting a salt of a fatty acid with ethylene oxide. Such non-ionic surfactants appear to act as beneficial crystal modifiers in the hemihydrate process described herein.

One of the preferred crystal modifiers, especially when AZ 10A is also present, is Actrasol W-40. Actrasol W-40 is a mixture of predominantly saturated sodium alkyl sulfonates. The alkyl groups are in the 12 carbon ranges, although there is a distribution from about 9–15 carbons. There are approximately 16 different sulfonates in the mixture; undoubtedly many are isomers and homologs of each other. It appears that Actrasol W-40 is made by the sulfonation of propylene tetramer, butylene trimer, or other material consisting of a mixture of isomers and homologs. Actrasol W-40 was isolated from aqueous solution by evaporation followed by azeotropic drying with hydrocarbon solvents. Separate samples were dried with hexane, toluene, and xylene.

Infra-red spectra taken on the dried samples showed 8 predominant absorptions. The following assignments have been made:

| Absorption Band # | Wave # CM$^{-1}$ | Assignment |
|---|---|---|
| 1* | 3445 | H$_2$O of hydration broad bands |
| 2 | 2840-2960 (3 bands) | C—H stretching aliphatic |
| 3* | 1640 | H$_2$O of hydration (rel. strong) |
| 4 | 1460 | C—H$_2$ deformation |
| 5 | 1375 | CH$_3$ deformation |
| 6 | 1170 | —SO$_3^-$ sym. stretching |
| 7 | 1050 | —SO$_3^-$ sym. stretching |
| 8 | 720 | C—H$_2$ rocking |

Bands #1 and #3 are reduced in intensity as the azeotropic drying temperature increases from about 65° (hexane) to 145° (xylene). Bands #1 and #3 are thus due to H$_2$O hydration. The remaining bands are consistent with the spectrum expected for sodium alkyl sulfonates. The difficulty in drying is not entirely unexpected since sodium salts of sulfonic acids do form stable hydrates.

Analysis done on a wet sample indicates that the atomic ratio of carbon to sodium (C/Na) is about 12. However, the same sample shows a carbon to sulfur atomic ratio of about 20. The C/Na and C/S ratio should be the same for a sodium alkyl sulfonate.

Bromine Titration. The degree of unsaturation of Actrasol W-40 in aqueous solution was determined by titration with bromine in water. A sample of Gulf C$_{18}$ alkene sulfonate was used as a standard. The equivalent weight of alkene in Actrasol W-40 was determined to be about 1880. This indicates that unsaturated species are either a minor component or an impurity. The former is more likely. A twelve carbon sodium sulfonate would have an equivalent weight of 272.

Derivative sulfonamide. A dried sample of Actrasol W-40 was converted to its diethyl sulfonamide derivative by the following sequence of reactions:

$$RSO_3Na + SOCl_2 \rightleftharpoons ROS_2Cl + SO_2 + NaCl \quad (1)$$

$$RSO_2Cl + Et_2nH \xrightarrow{pyr} RSO_2MEt_2 + pyr \cdot HCl \quad (2)$$

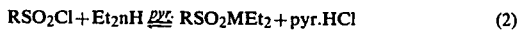

The sulfonamide derivative was examined by G.C. The infrared spectrum of the diethyl sulfonamide derivative shows the two expected absorption bands at 1370 and 1155 cm$^{-1}$ (asymmetric and symmetric —SO$_2$N stretching respectively).

Among the methods generally employed to make saturated alkyl sulfonates is that indicated by reaction 3.

$$(3)$$

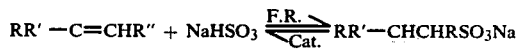

-continued $$RR'—C=CHR'' + NaHSO_3 \xrightleftharpoons[Cat.]{F.R.} RR'—CHCHRSO_3Na$$

An expected side product in this type of reaction is the corresponding alkene sulfonate (1 below) formed by disproportionation of the free radical intermediate. This would account $$RR'CH=CRSO_3Na$$
$$1$$

for the unsaturation detected in Actrasol W-40 by bromine titration. The detected unsaturation could also be the result of contamination by unreacted starting material, although 12 carbon alkenes would not be very soluble in aqueous solution.

Similarly an available alkene such as propylene trimer or butylene tetramer could provide starting materials for the preparation of the alkyl sulfonates. These feedstocks are mixtures of isomers and also contain some homologs of the major alkene isomers. Thus propylene trimer (C$_{12}$ ene) in addition to being a mixture of isomers would contain some C$_9$ and C$_{15}$ alkenes (the trimer and pentamer of propylene). The resulting sulfonates made from such a mixture would show the same type of chromatographic characteristics as the sulfonamide derivative of Actrasol W-40.

Thus, Actrasol W-40 appears to be a mixture of predominantly saturated sodium alkyl sulfonates of approximate composition indicated by 2.

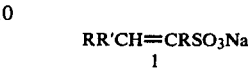

$$C_{12}H_{25}SO_3Na \cdot H_2O$$
$$2$$

"CONOCO C-560 Slurry" is described by the manufacturer as "Sodium Sulfonate of CONOCO SA-597" and as "A 60 percent active linear alkylbenzene sulfonate sodium salt produced from NALKYLENE 500" with a typical analysis as follows:

| Test | Specification |
|---|---|
| Active, Wt. % | 57-60 |
| Sodium Xylenesulfonate, Wt. % | 4 max. |
| Sodium Sulfate, Wt. % | 1.5 max. |
| Free Oil, Wt. % | 1.6 max. |
| Color, RCD | 0.4 max. |
| pH, 1% solution | 7-8 |

The P$_2$O$_5$ yield of the process can be improved by converting the hemihydrate filter cake to dihydrate cake by repulping it in water and sulfuric acid. The dihydrate slurry is filtered to separate the aqueous phase (phosphoric acid 30-35% P$_2$O$_5$) which is recycled to rock digestion.

Yield and filtration rate can also be improved by substantial completion of rock dissolution before significant crystallization occurs (as by using 2 dissolver reactors in series and using a source of phosphoric acid in the first reactor which is at 0.0 or less soluble sulfate.

A small filter or centrifuge can be installed between the crystallizer and the filter feed tank to withdraw the acid product, to use the filter feed tank, and Prayon filter can be used for gypsum filtration (second stage).

Another approach would be to operate the dissolver at 0% free sulfate level and send the slurry from the dissolver to a centrifuge where 50 to 70% of the acid (44% P$_2$O$_5$) is separated. The rest of the acid can go to the crystallizer where large crystals of hemi would be formed in phosphoric acid (25% P$_2$O$_5$) containing high sulfate levels. Cake wash and sulfuric acid would be added to the crystallizer as required.

Also, the hemihydrate cake could be repulped, e.g., slurried with wash water, such as pond water, and then refiltered without recrystallization, (this is the invention of Gary Beer). Yield and filtration rate can also be improved by removing fluoride and/or silicon compounds from the slurry liquid before significant crystallization (this is the invention of Gary Beer and Subhas Sikdar).

The following illustrates the effect of Actrasol W-40 on nucleation kinetics of hemihydrate. Two crystallization runs were performed, one without and one with 20 ppm of Actrasol W-40 in the crystallizer slurry. These two runs were operated with clear monocalcium phosphate solution feed; consequently, the solids concentration was low (0.5%). Monocalcium phosphate solution was continuously reacted with 95% H$_2$SO$_4$ in a single vessel maintained as a mixed-suspension mixed-product removal crystallizer. The effect of the presence of the surface active agent was seen in the nucleation and growth rates of the crystals. Crystal size distribution analyses were performed on samples collected between six and eight residence times into the run. The conditions of the two runs and the experimentally determined kinetics are listed below:

|  | Run a | Run a plus Actrasol |
|---|---|---|
| Temperature, °C. | 90 | 90 |
| Excess SO$_4$, % | 1.0 | 1.0 |
| Residence time, hr | 0.75 | 0.75 |
| RPM | 700 | 700 |
| Foaming | No | Yes |
| Surface active agent (Actrasol) | none | 20 ppm |
| Ca$^{++}$ in liquor, % | 0.128 | 0.176 |
| Nucleation rate no./(cc) (min) | 1.066×10$^4$ | 0.45×10$^4$ |
| Growth rate, | 0.273 | 0.316 |

The most interesting result is the suppression of the nucleation rate by more than 50%. The growth rate increased as a result. For the same residence time, the observed 15% increase in the growth rate indicates the same increase in the dominant particle size (viz. 52 M vs. 45 M). Another effect of the reagent was an increase in the solubility of calcium sulfate in the product acid (viz. 0.176% Ca vs. 0.128% Ca).

The decrease in nucleation rate caused an increase in calcium concentration of 0.035% which added to 0.128% brings the total roughly in the neighborhood of the observed calcium concentration of 0.176% for the run with the reagent. An increase in the calcium concentration in the face of a decrease in the nucleation rate means an increase in the stability of calcium sulfate in solution. However, the increase in the supersaturation driving force represented by calcium ion concentration did not appreciably raise the growth rate (i.e. the dominant particle size). From this analysis, it is concluded that the main effect of the reagent is in suppressing the nucleation rate.

A better environment in which to use the reagent is the vessel where the dominant phenomenon is nucleation. As a result the increased solubility can be utilized for higher growth rate in a growth crystallizer. In runs with two vessels in series without a recycle, the Actrasol (or other crystal modifiers, such as AZ 10A, with or without the sulfonate) can be applied to the first vessel (nucleator) while the second second vessel can be operated as a growth chamber for the crystals born in the first vessel.

The result reported here was obtained from runs conducted with clear monocalcium phosphate feed. The same trend is expected in runs with high solids content in the slurry. The concentration of 20 ppm of the reagent used was arbitrary. Note that Actrasol W-40 was responsible for some foaming in the vessel, which can be suppressed by the use of a defoamer, preferably comprising tall oil fatty acids and esters of tall oil fatty acids. Note also that impurities in the rock can alter crystal habit.

There are three analytical procedures which can be used to determine sulfate in phosphoric acid; namely, gravimetric, titration and turbidity.

In the gravimetric method, SO$_4$$^=$ is precipitated in HCl medium as BaSO$_4$ which is filtered, washed and weighed. The presence of HCl is necessary to prevent any barium phosphate precipitate. The procedure follows:

Weigh approximately 2 g (to the second decimal) of phosphoric acid, transfer into a 250 ml beaker and dilute with water to the 100 ml mark. Add 10 ml of 1/1 HCl and bring to a quiet boil. Using a dropping bottle, add drop by drop a solution of 10% barium chloride until no additional precipitate is formed but in any case add at least 2 ml of barium chloride solution even if no precipitate seems to appear. Let the boil proceed for 3 minutes and let the beaker cool somewhat. Add ¼ of a filter aid disk and stir for 3–5 minutes. Let settle for 10 minutes, filter on an ashless filter paper, wash with hot water until the washings are Cl$^-$ free, and transfer the precipitate to a vitreosil crucible. Calcine at 600°–700° C. and weigh.

If A is the weight of the phosphoric acid, B the weight of the BaSO$_4$ precipitate and W the %SO$_4$, then:

$$W = 0.412 \times B \times 100/A$$

This procedure was accurately checked by taking reagent grade phosphoric acid, adding to it a known quantity of SO$_4$$^=$ (as H$_2$SO$_4$), precipitating the SO$_4$$^=$ values by the indicated method and weighing the precipitate of BaSO$_4$. The results were accurate within 0.2%.

A procedure for the titration method is as follows:

Keep the liquors as hot as possible. Pipet 0.7 ml of clear liquor from the digestor or crystallizer slurry. Transfer this volume into a 250 ml conical flask. Add exactly 5 ml of 0.2 N H$_2$SO$_4$ and 25 ml of 50 volume % ethyl alcohol in water (also containing 1% NaCl. Swirl the liquid in the flask and put 3 drops of methyl orange and 2 spatulas of zinc oxide. Mix on a magnetic stirrer until color of methyl orange changes from orange to yellow, and stir for 1 more minute Vacuum filter through a porcelain filter using a No. 1 filter paper, making sure filtrate is clear. Wash the cake twice with about 5 ml of the 50% alcohol each time. Transfer filtrate (must not exceed 50 ml) into a 250 ml conicial flask, wide mouth, add 7 ml silver nitrate solution 0.1 N, and about 0.2 g of indicator with the tip of a spatula. Swirl to dissolve indicator and titrate slowly with barium chloride 0.2 N to a pink color. Record reading and call it "R".

$$\%SO_4 = R - 5$$

With some solutions, where negative sulfate ion is concerned, the titration method can give higher values than the turbidity method (e.g., −1.0% sulfate by titration and −2% by turbidity) or −3.3% by titration versus −6% by turbidity). However, both methods are usually in close agreement where positive sulfate is determined.

In the present invention the most important factor in the preferred operation is that by about every analytical method, a negative sulfate be maintained in the first (dissolver) vessel. Even a slight positive sulfate (e.g. +0.7%) in the dissolver can cause decreases in yield of phosphoric acid produced by the process (one cause being due to greatly increased nucleation, another at about 1.5% $SO_4$ to coating of the phosphate rock which decreases the amount dissolved).

Mesh size of the rock also influences yield, the smaller the particle size, the better the yield. Especially good results are obtained by wet screening rock to −28 mesh or smaller. No drying is needed.

The following is a procedure for turbidity determination of sulfate in phosphoric acid using the Bausch and Lomb Spectrophotometer. New curves must be made from time to time by a fresh calibration of the instrument and also with the use of a new instrument.

This method of sulfate analysis and its use as a quality control method in phosphate manufacture is the invention of Eli M. Chemtob and is the subject of Ser. No. 909,897 filed of even date and incorporated herein by reference.

Reagents
Barium chloride solution.

Dissolve 2.5 g. of carboxymethyl cellulose ether sodium salt in approximately 800 ml of water, in a 1 liter beaker maintained at 60° C. This dissolution will take a long time, 3–4 hours, and care must be taken that this solution is perfectly clear. After this dissolution time has elasped, cool to room temperature and add 10 ml of 1/1 HCl and 10 gm of barium chloride dihydrate to the cold solution and stir to dissolve. Make sure that the solution is perfectly clear. Transfer to a 1 liter volumetric flask and complete to the mark was distilled water. Mix and let settle for at least 72 hours. Transfer the decanted solution into a Repipet dispenser set to deliver exactly 5 ml.

Standard sulfuric acid solution: 50 gm per liter sulfate HCl 1/1.

Weigh out about 55 g. of reagent grade concentrated sulfuric acid and dissolve in a volume of water slightly over 500 ml. Determine the exact content of $SO_4^=$ by taking exactly 10 ml and titrating it with standard 1 N sodium hydroxide, using methyl orange as an indicator. Adjust the titer of the sulfuric acid solution to contain exactly 50 g $SO_4^=$ per 500 ml.

Transfer exactly 500 ml of this solution into a 1000 ml volumetric flask. Complete the dilution to the mark with concentrated HCl. The final solution thus made will contain 50 g of $SO_4^=$ per liter of 1/1 HCl. Confirm the titer by determining $SO_4^=$ gravimetrically. Store this solution in Repipet dispenser set to deliver exactly 2 ml.

Dilution solution for ethanol liquors.
Prepare this solution as follows:
100 ml concentrated HCL
50 ml concentrated $H_3PO_4$ (reagent)
Dilute with D.I. water to 4000 ml Store in a one gallon bottle and also in a Repipet dispenser set to deliver exactly 1 ml.

Preparation of the Standard Solutions of Phosphoric Acid

Weigh 20 gm of reagent concentrated phosphoric acid and dilute this weight with about 500 ml of water. Add exactly 20 ml of the standard sulfuric acid solution mentioned above, and transfer to a 1 liter volumetric flask and dilute to the mark. Mix and store in a 1 liter plastic bottle. This will be the stock solution of phosphoric acid containing 1000 mg $SO_4$ per liter.

Prepare standard solutions by taking a certain volume of the stock solution and diluting to 100 ml in a volumetric flask.

Calibration of the Instrument With the Standard Solutions

The wave length of a Bausch and Lomb spectrophotometer Model 120 is set at 510 nanometers.

Determining the blank.

Assuming the instrument is "on", transfer to the spectrophotometer tube 1.0 of diluent and 5 ml of $BaCl_2$ solution. Mix well by stoppering the tube and turning it upside down five time with a rather slow movement. Place the tube in the instrument and manipulate the blank knob to a 100% transmittance.

Determining the readings of the standard solutions.

1 ml of each of the standard solutions are taken in turn and transferred to the colorimeter tube. 5 ml of the barium chloride are added and the liquor in the tube is mixed as in the blank. The tube is now placed in the colorimeter and the reading recorded. The readings are plotted on a graph, each point corresponding with the $SO_4^=$ content (mg per liter). The transmittance is plotted on the abcissa and the $SO_4$ content (mg/liter) on the right ordinate. The points are connected to give a curve.

Determination of Sulfate in an Unknown Acid

The procedure which follows is valid with any acid having a positive or negative sulfate. If the acid is known to have a positive sulfate, the procedure can be simplified.

Completing the graph.

1 g of the phosphoric acid to be analyzed is taken and diluted with the proper amount of diluent to give a direct reading of the $SO_4^=$%. These values in % $SO_4$ are also reported on the *right* ordinate. At the point of the ordinate representing 500 mg $SO_4$ per liter, a horizontal line is drawn and on the left ordinate the point of impact is marked by the value zero. The divisions above the point, at 100 mg intervals, are marked +1, +2, +3, +4, +5, etc. and the divisions below point 0 are marked −1, −2, −3, −4, −5, etc. The diagram in this shape will give the sulfate values for any kind of acid in which the sulfate is either positive or negative.

General procedure for the determination of sulfate (positive or negative).

0.660 ml of acid (in the case of acid containing 40% $P_2O_5$) are taken with the 660 microliter micropipet and transferred into a 100 beaker. 2 ml of the sulfuric acid solution are added from the Repipet dispenser and the mixture allowed to stand at least 5 minutes. A precipitate of calcium sulfate dihydrate will usually appear if the phosphoric acid contains a negative sulfate. Measure out in a graduated cylinder 48 ml of ethanol and transfer into the 100 ml beaker. Stir the mixture with a glass rod and set aside for 5 minutes. In the meantime, prepare a filter, using the plastic funnel and Whatman no. 1 (18.5 cm) filter paper, and filter and liquor. Measure exactly 10 ml of the filtrate and add 30 ml of diluent solution. Stir for a minimum of 1 minute with the magnetic stirrer and transfer 1 ml (with the 1000 microliter pipet) in the colorimeter, wait for 30 sec. and record the transmittance reading. Using the diagram required previously, plot the reading and read the % $SO_4^=$ on the left ordinate, whether positive or negative.

Simplified procedure for an acid known to have a positive sulfate.

This procedure is much simplified since it does not require any calcium precipitation or any filtration, or any waiting periods. 0.660 ml of acid (40% $P_2O_5$) are transferred into a 150 ml beaker. Transfer 100 ml of the diluent solution into the beaker and stir with a glass rod. Take 1 ml of this solution with the 1000 microliter micropipet, and transfer it to the colorimeter tube. Add 5 ml of barium chloride solution and mix the liquor as in the standard samples. Put the tube in the instrument, and record the transmittance reading. Plot the reading on the diagram and read the % $SO_4^=$ on right ordinate.

Have a 1000 ml beaker full of distilled water nearby. Wash all tips of micropipets in this water without removing them from the pipet and set the micropipet to dry on the pipet rack. A considerable amount of time is saved by not removing the tips to replace other tips.

The colorimeter tube must be cleaned after each determination with a brush and cleaner like Ajax, etc., to remove the film of $BaSO_4$ and dispersant.

Accuracy and Reproducibility

Provided the directions of the procedure are carefully followed, the accuracy is within 5% and the reproducibility is also of the same order. It is recommended to use the water method for the positive sulfate and the alcohol method for the negative sulfate.

If the second (crystallizer) reactor is not subjected to reduced pressure to provide cooling, external cooling means (such as a flash cooler) can be provided to cool the slurry.

In the present process the mechanical energy supplied to facilitate solution of the rock is much less than in other prior art hemihydrate processes because maximum advantage is taken of chemical driving forces (maintaining homogeneous suspensions to provide an undersaturated environment around the particles).

Detailed Description of the Drawings

FIGS. I, II, and III are schematic diagrams of embodiments of the process. In FIG. III, Phosphoric acid at about 70° C., which is added through conduit 6, and phosphate rock, which is added through conduit 8, are slurried in vessel 2 which is fitted with an agitator 4. Defoamer can be added as needed through conduit 10. In a preferred embodiment, conduit 10 is of a much greater height and/or diameter than is required solely for introduction of the defoamer and, thus, can function as a vent. Properly chosen venting can greatly reduce foaming and, in many cases, can eliminate the need for a defoamer in the "reslurry" vessel 2. The temperature of slurry 11 so formed is about 92° C. and the solids content is about 30% to about 40% by weight. Slurry 11 is transferred through conduit 12 to vessel 16. Vessel 16 is fitted with an agitator (shaft 18 and propeller 21 attached to the bottom thereof), and a draft tube 20 which is secured to the inside wall of vessel 16 by braces (not shown). Slurry 11 flows into slurry 22 which is composed of calcium sulfate hemihydrate, monocalcium phoshate, phosphoric acid, and sulfuric acid. The propeller 21 of the agitator is so positioned with respect to the location of the draft tube 20 that on actuation of the shaft 18 and propeller 21 by a motor (not shown), slurry 22 in vessel 16 will flow from the bottom portion of the draft tube 20 up through the draft tube. On exiting the top of the draft tube, slurry 22 will flow downwardly in the space between the draft tube 20 and the inside walls of vessel 16. Alternatively, the propeller blade can be positioned closer to the bottom of the draft tube and, if desired, the flow can be reversed (i.e., to flow upwardly in the space between the draft tube and the inside walls). A first portion of slurry 33 is transferred from vessel 28 through conduit 38 to vessel 16. The flow created within vessel 16 thoroughly mixes slurry 11 and slurry 33 within slurry 22. Slurry 22 is then transferred to vessel 28 through conduits 24 using pump 25. Vessel 28 may be vertically offset from vessel 16 or it may be on the same level as vessel 16. Samples for analysis of the first slurry are removed from sample port 24a. Slurry 22 is at a temperature of about 66° C. to about 113° C., and has a soluble sulfate value of about +0.7 to about −4% (most preferred below 0.0).

On entering vessel 28 which is equipped with an agitator (shaft 30 and propeller 31 attached to the bottom thereof), a draft tube 32 and a sulfuric acid inlet 34, slurry 22 is dispersed into slurry 33. Draft tube 32 is secured to the inside wall of vessel 28 by braces (not shown). Sulfuric acid is added from the sulfuric acid inlet 34 and is also thoroughly dispersed into slurry 33. Crystal modifier may be added to vessel 28 through an inlet 23a. Activation of the agitator (shaft 30 and propeller 31) by means of a motor (not shown) causes a flow of slurry 33 from the bottom of the draft tube 32 up through the draft tube and out the top portion of said draft tube. On exiting the top of the draft tube 32, the slurry flows downwardly in the space between the draft tube 32 and the inside walls of vessel 28. A circulation established within vessel 28 disperses slurry 22 and sulfuric acid into slurry 33, constantly renewing surface 36. Vessel 28 is maintained at a pressure of about 2 inches of mercury to about 29 inches of mercury absolute. Water is evaporated from the hot slurry, thus cooling the slurry. In addition to water, other volatile materials produced by the reaction of sulfuric acid and phosphate rock are also removed. These materials include $CO_2$, HF, $SiF_4$, $H_2S$, $SO_2$ and others. Because of the internal circulation of the slurry within vessel 28, temperature gradients are minimized. Slurry 33 (maintained at a temperature of about 66° C. to about 113° C., preferably from about 80° C. to about 105° C., and having a positive sulfate content, preferably about +0.7 to about +4.5%) is recirculated back to vessel 16 through conduit 38. Slurry 33 is efficiently dispersed within slurry 22 in vessel 16 by means of the internal circulation within vessel 16. Thus, a system has been developed in which both inter and intra-vessel circulation occur so as to better disperse the reactants being added to the slurries and to reduce temperature gradients within the vessels due to heating the cooling. This circulation system permits rapid and easy plant control and the negative sulfate level in the dissolver acts like a buffer to adsorb inadvertent sulfate concentration increases in the crystallizer.

A portion of slurry 33 about equal to the amount of reactants added (phosphoric acid, phosphate rock an sulfuric acid), minus the amount of water and volatiles removed from the system is removed from vessel 28 through conduit 40. Samples for analysis of the second slurry are removed from sample port 42 located on conduit 40. The slurry is pumped (pump 35) to the diversion or splitter box 44 from which it flows to vessel 48 through conduit 46. Agitator 50 maintains the slurry in a dispersed condition in vessel 48. The slurry is pumped (pump 3a) from vessel 48 through conduit 52 to the separation section (not shown in FIG. III but shown in FIG. I). In start-up, valve 52a can be used to direct the slurry through line 3 to vessel 2, and, thus, bypass the filter and provide a fast means of building up the solid level in the slurry without dumping wet pans.

Reactants are continuously added to vessel 16 and 28, while water and volatiles and the product slurry are constantly being withdrawn from vessel 28. In case of a separation apparatus breakdown, the system can be placed on recycle. No reactants are added to the system. Intra-vessel circulation would continue and inter vessel circulation would be discontinued. As is discussed further hereinafter, the circulation system in FIG. III is especially useful in providing an economical and easy to control start-up or restart (after a short interruption) procedure.

It is to be recognized that the elevation of vessels 2, 16, 28, 44 and 48 with respect to each other is a preferred arrangement but may be varied. Likewise, the conduits connecting vessels 2, 16, 44 and 48 may be rearranged, additional conduits added and/or existing conduits deleted. For example, slurry 22 passing from vessel 16 to vessel 28 may be introduced into the top part of vessel 28 rather than the bottom part.

Another embodiment of the claimed invention is shown in FIG. II. Instead of adding the reactants phosphoric acid, phosphate rock and if necessary, the defoamer to a preslurry vessel 2 as shown in FIGS. I and III, the reactants are added directly to the first slurry 22 in vessel 16. The phosphoric acid is added through conduit 7 and the phosphate rock is added through conduit 9. The reactants are added in amounts such that the direct combination of the two results in a slurry containing between about 30% to about 40% solids by weight and an initial concentration of about 13% to about 47% $P_2O_5$ in the liquid portion of the slurry. Defoamer is added through conduit 13, if, and when needed. Once the reactants are dispersed in the first slurry 22, the parameters such as temperatures, pressures, concentrations, and flows are the same as described above for the more preferred embodiment.

FIG. II illustrates a less-preferred method of operation useing two feed lines 24 and 26 from the dissolver vessel 16 to the crystallizer 28. One line is at least double the diameter of the other. In the hemihydrate process described herein, the larger of these lines (and the associated pump) need not be used. However, the larger (or both lines) can be used if the system is operated as a gypsum process (as disclosed in Ser. No. 703,138). Such double lines can also be incorporated in the systems of FIGS. I and III if these systems are to be used in a gypsum process. This convertibility from hemihydrate to gypsum is an advantage of the reaction systems described herein.

FIG. III also illustrates a system and apparatus for phosphoric acid production by calcium sulfate hemihydrate formation. This system for the preparation of phosphoric acid from phosphate rock and sulfuric acid includes in combination a first reaction vessel (the dissolver, 16) containing a first slurry (22) comprising calcium sulfate hemihydrate, monocalcium phosphate and phosphoric acid, a second reaction vessel (the crystallizer, 28) containing a second slurry (33) comprising calcium sulfate hemihydrate, monocalcium phosphate, sulfuric acid and phosphoric acid, means in each of said vessels for maintaining a continuous circulation of the slurry therein, said last mentioned means including a draft tube (20 in the dissolver, 32 in the crystallizer) disposed centrally in each of said vessels and an agitator (18, 30) positioned axially in each of said vessels within said draft tube, whereby on actuation of said agitator the slurry in each of said vessels will flow from the bottom portion of said draft tube up through the draft tube and on exiting the top of the draft tube, the slurry will flow downwardly in the space between said draft tube and the inner wall of the vessel, a first conduit (24) interconnecting said first and second reaction vessels for conducting said first slurry from said first reaction vessel to said second reaction vessel, a second conduit (e.g. an overflow 38) interconnecting said vessels for conducting said second slurry from said second reaction vessel to said first reaction vessel, means for applying a vacuum (as indicated at 28a) to said second reaction vessel to effect temperature control in said second reaction vessel and to thereby form a vacuum seal between said first and second reaction vessels, an inlet pipe (12) for introducing phosphate rock and phosphoric acid to said first reaction vessel, said inlet pipe connected with the interior of the draft tube in said first vessel, means for introducing sulfuric acid to said second reaction vessel (e.g. a sparger 34) and means (40) for withdrawing a slurry containing phosphoric acid and calcium sulfate hemihydrate from said second reaction vessel.

The system can include a third reslurry vessel (2) for reslurrying phosphate rock and recycle phosphoric acid, and a third conduit (12) interconnecting said third vessel with said inlet pipe to said first reaction vessel. In the system, the first vessel can be a dissolver vessel for essentially dissolving phosphate rock in said first slurry, said second evacuated reaction vessel being cooled by evaporation and functioning as a crystallizer vessel for crystallizing calcium sulfate hemihydrate in said second slurry, and including a fourth filter feed vessel (48), and a fourth conduit (40b and 46) interconnecting said last mentioned means (40) for withdrawing slurry from said second reaction vessel with said fourth vessel, for conducting said second slurry containing crystallized calcium sulfate hemihydrate and phosphoric acid to said fourth vessel, and an agitator (50) in said fourth filter feed vessel for maintaining the slurry therein in suspension. The system can include a surge tank (44) or a splitter box (44a in FIG. 1) in said fourth conduit which provides a sufficient liquid head to provide a vacuum seal and (with the splitter box) a break in the line to prevent siphoning.

A splitter box is a compartmented vessel, usually containing a wire-like partition (which can be fixed or movable) and is usually used like a valve in a conduit system for a slurry (that is, it usually is used to divert flow).

The system can include filter means (the filter in FIG. 1), a fifth conduit (52) for conducting slurry containing crystalline calcium sulfate hemihydrate and phosphoric acid from said fourth filter feed vessel to said filter means, for filtering crystalline calcium sulfate hemihydrate from said slurry, and a sixth conduit (6) connecting said filter means with said third reslurry vessel for conducting filtrate containing phosphoric acid to said third vessel. The system can include a rock box (see FIG. 1) in said fourth conduit for trapping any relatively large rocks, stones and objects (especially solids formed on the sulfuric acid sparger) in said second slurry. The rock box also includes washing means (e.g., a water line, not shown) and discharge means (e.g., a drain, not shown) for removing entrapped particles during a shut down period or they can be shoveled out. In the system, the first dissolver vessel (16) can be positioned at an elevation higher than said fourth filter feed vessel (48) and include an overflow pipe (26) from said first vessel to said fourth vessel for conducting overflow slurry from said first vessel by gravity to said fourth vessel.

In the system, the second reaction vessel (28) can be positioned at an elevation higher than said first reaction vessel, said second conduit (38) being an overflow conduit permitting return of said second slurry in said second vessel by gravity through said second conduit to said first slurry in said first vessel. In the system as defined in claim 1, including a vent (5) connected to said inlet pipe (12) to permit escape of gases and reduce foaming generated by the dissolving reaction in said first vessel. The system can include a sparger (34) in the bottom portion of said second vessel below the draft tube therein, said means for introducing sulfuric acid into said second vessel comprising an inlet (34a), said inlet being connected to said sparger. The system can include a first recirculation conduit (24, 14) for selectively recirculating said first slurry from said first vessel externally thereof and back to said first vessel, a first pump (25) in said first recirculation conduit, a second recirculation conduit (40, 40a, 23b) for selectively recirculating said second slurry from said second vessel externally thereof and back to said second vessel, a second pump (35) in said second recirculation conduit, and valve means (15,17) for discontinuing slurry flow in said first conduit from said first vessel to said second vessel and to permit recirculation of slurry through said first recirculation conduit or valve means (29, 43) to permit recirculation of slurry through said second recirculation conduit.

FIG. IV shows a preferred apparatus (16) for the preparation of phosphoric acid from phosphate rock and a strong acid, which comprises a closed vessel 62, a draft tube 20, means (braces 64) connected to the inner walls of said vessel and mounting said draft tube in a vertical position within said vessel, an agitator 21 positioned within said draft tube, a shaft 18 for said agitator mounted axially of said vessel and extending into said draft tube, an inlet conduit 12 to said vessel for introducing a feed slurry of phosphate rock and strong acid into said vessel, said inlet conduit having a lower end portion 12a terminating within said draft tube 20.

The inlet conduit can have an elongated portion 12b extending downwardly within said vessel, and having an external upper vent portion 21 and an inlet portion 70 connected to said upper portion, said feed slurry being fed into said inlet portion.

In the apparatus, the draft tube can have an outwardly flared lower skirt portion 66 terminating in the bottom portion of said vessel, and can include a vent pipe 5 connected to said inlet conduit to reduce foaming generated by the reaction in said vessel. The inlet conduit can have an essentially vertical portion 12b positioned within said vessel, and have an external vertical upper portion 5 extending above said vessel and an inlet portion 70 externally of said vessel and connected at an angle to said vertical external upper portion of said inlet conduit, said feed slurry being fed into said inlet portion 70, and said interconnected vertical upper portion 1 of said inlet conduit being said vent pipe.

In the apparatus, the agitator 21 can be positioned in the upper portion of said draft tube 20 (as in FIG. IV), or at the lower portion, or at an intermediate level. The lower end portion 12a of the inlet conduit 12 can terminate in the draft tube 20 below the agitator 21. The vessel 16 can have an outlet 72 in the lower end thereof below said draft tube 20.

The inner wall 74 of said vessel adjacent to the bottom thereof can be downwardly dished at 16 adjacent the lower end of said draft tube. The apparatus can include an overflow pipe 26 extending from the upper end portion of said vessel 62, and a recycle slurry pipe 38 extending into said vessel 62 and terminating 38a at a zone in the annulus thereof between the outer wall 20 of said draft tube and the inner wall 74 of said vessel, adjacent the lower skirt portion 66 of said draft tube.

The apparatus can include means 1a for introducing a treating or defoaming agent into said vent pipe 1. In the apparatus, the draft tube 20 can have an outwardly flared lower skirt portion 66 terminating in the bottom portion of said vessel 62, said vessel having an outlet 72 in the lower end thereof below said draft tube, the inner wall 74 of said vessel adjacent the bottom thereof being downwardly dished (at 16a), adjacent the lower end 66 of said draft tube 20. The apparatus can include an overflow pipe 26 extending from the upper end portion of said vessel 62, a recycle slurry pipe 38 extending into said vessel and terminating at a zone in the annulus thereof between the outer wall of said draft tube and the inner wall 74 of said vessel, adjacent the lower end portion of said draft tube, and an additional inlet pipe 68 in said vessel for the introduction of steam or a treating or defoaming agent.

ILLUSTRATIVE EXAMPLES

EXAMPLE 1

Vessels 16 and 28 and the accompanying connective means such as conduits, pumps, etc. of FIG. III are filled with a slurry consisting of calcium sulfate hemihydrate, monocalcium phosphate, phosphoric acid and sulfuric acid. The weight percent of the solids in the slurry is about 31%, the specific gravity of the degassed slurry in vessel 28 is about 1.80 g/cc. $P_2O_5$ concentration of the liquid portion of the slurry is about 42% by weight. The temperature of the slurry in vessel 16 is between about 88°–102° C. preferably between 92° C. and 105° C., whereas the temperature in vessel 28 is between 88° and 105° C., preferably 92° C. and 105° C. Soluble sulfate concentration in vessel 16 is from about +0.6 to about −7% (preferably 0.0 to −6) and the soluble sulfate concentration in vessel 28 is above 0.0 (preferably from about 0.7% to adjust +4.5%).

A mixture of phosphate rock (typical analysis shown in Table 2 and a size distribution shown in Table 3), and phosphoric acid is prepared by adding phosphate rock to phosphoric acid in the ratio of about 1647 pounds of phosphate rock (about 31.2 $P_2O_5$ and 45.6 CaO) to about 3700 pounds of phosphoric acid (about 32% $P_2O_5$). The temperature of the mixture is about 90° C. A tall oil-sulfonic acid defoaming agent (AZ 10A) is added as needed to reduce the foam caused by partial dissolution of the phosphate rock in phosphoric acid.

This phosphate rock-phosphoric acid mixture is added to the first slurry in vessel 16 at the rate of about 380 gpm (about 5350 pounds per minute). The incoming mixture is thoroughly mixed with the first slurry and a first portion of the second slurry from the second reaction vessel. Intra vessel mixing is accomplished by means of the draft tube and the agitator. The first slurry is pumped from the first reaction vessel 16 to the second reaction vessel 28 at the rate of about 1640 gallon per minute. The first slurry is thoroughly mixed with the second slurry and 98% sulfuric acid which is added to the second reaction vessel at about 87 gpm. An organic sulfonic acid derivative can be added to the second reaction vessel 28. This material is added to promote the growth of the hemihydrate crystals. The first slurry, the sulfuric acid and the crystal modifier are thoroughly dispersed into the second slurry in the second reaction vessel 28. The second slurry flows at the rate of about 1280 gallons per minute from vessel 28 into vessel 16 where it is thoroughly mixed with the first slurry.

About 45 gpm of water and volatile materials (HF, $SiF_4$, $H_2S$, $CO_2$ etc.) is vaporized from the second slurry in vessel 28. Vessel 28 is maintained at about 15 inches of mercury absolute. Approximately 400 gpm of slurry is withdrawn from the second reaction vessel and flows to vessel 48, the separator feed tank. Thus about 445 gpm of material (vaporized material and the slurry to the separator feed tank) is removed from the system. The removed slurry is then passed to the separation section where the solid and liquid portions of the slurry are separated.

At these rates, the plant will produce about 350 tons per day of $P_2O_5$ of 35–44% $P_2O_5$ phosphoric acid. The recovery data is summarized below.

| TOTAL LOSS IN FILTER CAKE | |
|---|---|
|  | % of $P_2O_5$ fed in rock |
| Citrate insoluble (CI) | 0.76 |
| Citrate soluble* (CS) | 4.64 |
| Water soluble (WS) | 2.34 |
| Total loss | 7.74 |
| Total recovery | 92.26 |

*Lattice substitution losses determined using ammonium nitrate instead of ammonium citrate solution.

A typical analysis of the phosphoric acid produced by this process is shown in Table 4. The total residence time, from entering vessel 16 to exiting vessel 48, is calculated at 7.9 hours. The volume of vessel 16 is about 120,000 gallons, the volume of vessel 28 is about 40,000 gallons to normal liquid level.

Phosphate rock is present in the first and in the second slurries in the first and second reaction vessels respectively. The amount present is quite small and will vary considerably. The value for the "Citrate Insoluble" loss of the filter cake is a rough measure of undissolved and unreacted phosphate rock.

EXAMPLES 2 TO 7

The following system as described hereinafter was set up in a pilot plant to duplicate actual plant operation in order to investigate the effect of defoamers and crystal modifiers on the filterability, and hence the crystal size, of the calcium sulfate hemihydrate produced.

Into a first reaction vessel containing reaction slurry was added phosphate rock, recycled phosphoric acid and recycle reaction slurry from the second reaction vessel. Defoamer, when used, was added in the first reaction vessel. The reaction slurry so formed in the first reaction vessel was circulated to the second reaction vessel. Sulfuric acid and crystal modifiers were added to the second reaction slurry. The second reaction vessel was maintained under slight vacuum so as to remove gaseous impurities and water from the slurry. The evaporation of water was utilized to cool the reaction slurry.

The conditions employed in determining the utility of the crystal modifier and the defoamer in early runs and later runs are shown below in Table 5. Results of the tests from the later runs are shown in Table 6.

Phosphate rock is present in the first and in the second slurries in the first and second reaction vessels respectively. The amount present is quite small and will vary considerably. The value of the "Citrate Insoluble" loss of the filter cake is a rough measure of undissolved and unreacted phosphate rock.

EXAMPLE 8

A hemihydrate system substantially as shown in FIGS. I and III and operated substantially as described in Example 1 was discovered to be wasteful of product acid on start-up, that is, the first one or two days of production could not be economically filtered due to fine particles in the feed to the filter and had to be "dumped wet" with a resulting new high loss of $P_2O_5$ values.

In a modified start-up procedure, which is the invention of Gragg et al, the system was first filled with water heated by steam to 210° F. This preheated the vessels while testing the equipment at temperature. The system was drained and filled with 185° F., 31% $P_2O_5$ acid. Phosphate rock was fed to the system, while acid was recycled from the filter feed tank until the solids were builtup to about 30%, the sulfates were adjusted to the proper level (e.g., negative in the dissolver and positive in the crystallizer), and slurry was then sent to the filter. The plant was started up at 150 tons/day feed rate. The filter was lined out within 2 hours of startup (i.e., no wet pans after 2 hrs.). Within 48 hours the design rate of 350 TPD was achieved with no apparent problems. Product acid strength was up to 40% $P_2O_5$ within one shift.

After the completion of a 44 day plant test and several modifications to the dissolver, the plant was again started up. Essentially the same startup procedure was used except the system was not preheated with hot water and 35% acid at 185° F. was used in the charging of the system. The startup went very smoothly with no particular problems, although the filling of the system was slowed by evaporator problems. The first hemihydrate cake that was produced filtered well. No filter pans were dumped wet during startup.

Upon completion of the plant trial runs in this Example 8, the average parameters in Table 7 were calculated from data gathered over the entire course of the runs.

FIG. 1 illustrates a reaction system, which can be used either for a hemihydrate or gypsum process, similar to that of FIG. III but showing the incorporation of a splitter box (to provide a head or vacuum seal and also a break to prevent siphoning) and a rock box (to trap hard pebble-like masses which apparently accumulate upon and break off from the sulfuric acid sparger in the crystallizer). Also shown are the condenser between the crystallizer and the vacuum pump (which condenses steam and fluorine compounds), and scrubber to protect the vacuum pump from fluorine compounds and an entrainment separator or disengager (to prevent non-gaseous matter, mostly droplets containing fluorides, from entering the vacuum pump) and the filter (which is the preferred means of separating the calcium sulphate solids from the product phosphoric acid). The splitter box is a compartmented vessel with an entry line which can be moved to the top of either compartment (for slurry from the crystallizer) at the top of one compartment and two exit lines, one at the bottom of each compartment. One exit line is for conducting slurry to the filter feed tank, the other leads to a drain and is used for cleaning the line and the splitter box.

The present process and system used in practice of the invention of Ser. No. 676,559, especially in a process for the production of high purity phosphoric acid from phosphate rock containing metal impurities comprising calcium, magnesium, aluminum, ferric and ferrous iron which comprises:

(a) contacting the phosphate rock with dilute phosphoric acid at a temperature of from about 180° F. to about 220° F. to form a reaction mass containing extracted phosphate values from the rock in the form of dissolved calcium monophosphate and having a slurry density in the range of about 20% up to about 45% solids by weight;

(b) contacting the resultant reaction mass with sulfuric acid at a temperature of from about 180° F. to about 220° F. to convert the calcium monophosphate to calcium sulfate hemihydrate and phosphoric acid and to form a dilute, crude phosphoric acid containing from about 40% to about 47% $P_2O_5$ and at least one of said metal impurities comprising calcium, magnesium, aluminum, ferric and ferrous iron and phosphate rock gangue;

(c) separating the dilute, crude phosphoric acid containing the ionic metal impurities from the gangue;

(d) contacting the dilute, crude phosphoric acid with at least one water immiscible liquid organic sulfonic acid compound selected from alkyl sulfonic acids, alkylaryl sulfonic acids and polyalkylaryl sulfonic acids and mixtures thereof having at least 12 carbon atoms, said aromatic sulfonic acids optionally substituted on the aromatic ring with one or more of the following groups: alkoxy, alkanonyl, halo, hydroxy, nitro, to form:

(i) an organic phase containing the liquid organic sulfonic acid compound and extracted ionic metal impurities;

(ii) a purified dilute aqueous phosphoric acid phase;

(e) separating the dilute purified phosphoric acid phase from the organic phase; and (f) regenerating the liquid organic sulfonic compound by contact with a mineral acid for recycle; and, optionally, (g) concentrating the dilute purified phosphoric acid phase.

Treatment of the phosphoric acid to remove organics (as with an oxidizing agent) prior to the extraction step (d) above can reduce or prevent crud formation, see further Ser. No. 810,848.

Recent runs tend to establish that prior art sulfonic acid crystal modifiers were used at too high a concentration (e.g., over 2000 ppm) see Table 8 herein.

Table 1

| Rock Fed TPD | CaO in Rock % | SO$_4$ in Rock % | CaO Fed TPD | Stoichiometric Sulfate (SO$_4$) to CaO in Rock TPD | Sulfate Present in 100% H$_2$SO$_4$ Fed to Unit, TPD | Sulfate Equivalent Used TPD | Total Sulfate Used TPD | Total SO$_4$ used as a fraction of Stoichiometric Amount |
|---|---|---|---|---|---|---|---|---|
| 1209.5 | 44.90 | 0.65 | 543.07 | 930.97 | 844.4 | 7.86 | 852.26 | 0.915 |
| 1383.1 | 45.97 | 0.65 | 635.81 | 1089.4 | 1052.2 | 8.99 | 1061.2 | 0.974 |
| 1381.6 | 46.76 | 0.65 | 646.04 | 1107.5 | 1024.7 | 8.98 | 1033.7 | 0.933 |
| 1172.2 | 46.81 | 0.65 | 548.71 | 940.64 | 844.3 | 7.62 | 851.9 | 0.906 |
| 1110.9 | 46.89 | 0.65 | 520.90 | 892.97 | 804.6 | 7.22 | 811.82 | 0.909 |

Table 2

Phosphate Rock Analysis

| Compound | For Example 1 % By Weight | For Example 8 % By Weight |
|---|---|---|
| $P_2O_5$ | 31.2 | 32.15 |
| CaO | 45.6 | 46.81 |
| $Fe_2O_3$ | 1.4 | 0.79 |
| $Al_2O_3$ | 1.2 | 1.12 |
| MgO | 0.4 | 0.37 |
| $SiO_2$ | 8.7 | 4.6 |
| F | 3.7 | 3.59 |
| $SO_3$ | 0.9 | |
| $CO_2$ | 3.6 | |
| Organic | 1.8 | |
| $H_2O$ | 1.1 | 2.08 |
| $Na_2O, K_2O$ | 0.4 | |
| $SO_4$ | | 0.79 |

Table 3

Typical Phosphate Rock Screen Analysis

| Mesh | Commulative Percent |
|---|---|
| +14 | 0.4 |
| +24 | 2.6 |
| +28 | 9.3 |
| +35 | 26.6 |
| +48 | 64.1 |
| +65 | 86.4 |
| +100 | 97.7 |
| −100 | 2.3 |

Table 4

Phosphoric Acid Analysis

| | Example 1 | Example 8 |
|---|---|---|
| $P_2O_5$ | 37.95 | 41.77 |
| $SO_4$ | 1.72 | 2.41 |
| CaO | 1.04 | 0.23 |
| F | 1.27 | 1.22 |
| MgO | 0.46 | 0.51 |
| $Fe_2O_3$ | 0.97 | 0.97 |
| $Al_2O_3$ | 0.91 | 0.84 |
| Solids | | 0.78 |
| Sp. Gr. | | 1.517 |

Table 5

GENERAL REACTION CONDITIONS
(Pilot Plant)

| | Early Runs | Later Runs |
|---|---|---|
| Slurry Density | 1.72 g/cc | 1.72 |
| Sulfate Concentration* | | |
| First Reaction Vessel | −2% | −2 |
| Second Reaction Vessel | +2% | +2 |
| Phosphate Rock Feed Rate | 174 g/min. | 174 |
| Slurry Recycle From Second To First Reaction Vessel | 2200 g/min. | 2200 |
| Recycle Phosphoric Acid Feed | | |

Table 5-continued

GENERAL REACTION CONDITIONS
(Pilot Plant)

| | Early Runs | Later Runs |
|---|---|---|
| Rate To First Reaction Vessel | 390 g/min. | 390 |
| Sulfuric acid (93%) Feed Rate To Second Reaction Vessel | 150 g/min. | 150 |
| Defoamer Feed Rate To First Reaction Vessel | 0.7–1.1 g/min. | 0.25–0.76 |
| Crystal Modifier (CM) Feed Rate To Second Reaction Vessel (1% Soln of CM in Water) | 0.1–0.4 g/min. | 0.006–0.76 |
| Temperature of Slurry In Both Reaction Vessels | 195°–205° F. | |
| 50% Mass Dominant Crystal Size | 30–40 | 26–43 |

*By titration method

Table 6

| Example | Defoamer Type | Amount Wt. % | Crystal Modifier Type | Amount ppm* | Filter Rate** TON $P_2O_5/ft^2$-day | Calcium Sulfate Hemihydrate 50% Mass Dominant Crystal Size (microns) |
|---|---|---|---|---|---|---|
| 1 | None | None | None | None | 0.35 to 0.42 | 42.8 |
| 2 | None | None | None | None | 0.70 | 39.1 |
| 3 | None | None | Actrasol W-40 | 0.1 | 0.85 | 42.8 |
| 4 | AZ10A | 0.071 | Actrasol W-40 | 10.8 | 1.24 | — |
| 5 | AZ10A | 0.12 | Actrasol W-40 | 12.3 | 1.72 | — |
| 6 | AZ10A | 0.058 | None | None | 0.80 | 35 |
| 7 | AZ10A | 0.061 | Actrasol W-40 | 12.2 | 0.70 | 35 |
| 8 | AZ10A | 0.037 | Actrasol W-40 | 10.0 | 0.45 | 26 |

Actrasol W-40 - primarily sodium dodecylsulfonate, Arthur C. Trask Corp., Summit, Ill. 60501
AZ10A - Tall oil fatty acids and esters*, AZ Products Co., P.O. Box 67, Eaton Park, Florida 33840
*AZ Defoamer 10-A is a proprietary blend of tall oil fatty acid and a variety of surfactants.
*Based on weight of slurry
**15 in Hg, 1¼" coke thickness, wash to dry solids 1.02, 33% solids in slurry, 40 to 44% $P_2O_5$

Table 7

| | Run Average |
|---|---|
| Temperature in Dissolver - °C. | 94–98 |
| Amount $SO_4$ Added Stoichiometric $H_2SO_4$* | 0.96–0.97 |
| % $P_2O_5$ in Product from Crystallizer | 44 |
| Temperature in Crystallizer - °C. | 98–101 |
| Reactor Volume First Stage / Reactor Volume Second Stage | 2.87** |

*Amount $H_2SO_4$ required to convert Ca in Feed to Dissolver to Calcium Sulphate including $SO_4$ in Rock

Table 8

EFFECTS OF SURFACTANTS ON HEMIHYDRATE CRYSTALS

| Run | Percent Solids | Density of Product Acid, gm/ml | Viscosity of Slurry* CP at 92° C. | Filterability** | Dominant Size $L_{50}$ Microns | Habit*** | Lattice Bound Loss in Cake |
|---|---|---|---|---|---|---|---|
| 2, Reference | 35.1 | 1.48 | 127.5 | Good | 26.6 | Raspberries | 1.47 |
| 3, 2280 PPM of acid form | 30.0 | 1.48 | 17.5 | Poor | 21.4 | Raspberries & tiny spherulites | 3.65 |
| 4, 1000 PPM of Sodium Salt form | 31.2 | 1.48 | 39.0 | Very Good | 30.6 | Predominantly raspberries | 2.2 |
| 6, 100 ppm of acid form | 29.9 | 1.50 | 65.0 | Good | 26.7 | Raspberries | 1.42 |

*Measured by a Brookfield viscometor at 12 RPM with spindle No. 1. Multiplied by 5 to obtain entries in Cp at 60 RPM.
**50 gm of slurry was filtered through a 5.5 cm Buchner Funnel into a 125 ml. Filter flask, a Whatman No. 1 filter paper was used. The filtration is characterized as very good, good and poor by observing the time of drain.
thus:
Very good means time of drain was less than 10 seconds.
Good means time of drain was about 20 seconds.
Poor means time of drain was about 45 minutes.

What is claimed is:

1. A process for the preparation of phosphoric acid from phosphate rock and sulfuric acid comprising the steps of:

(a) adding phosphate rock and phosphoric acid to a first reaction vessel which contains a first slurry comprising calcium sulfate hemihydrate, monocalcium phosphate, and phosphoric acid, whereby the added phosphate rock is substantially converted to monocalcium phosphate, calcium sulfate hemihydrate, and phosphoric acid, while maintaining the first slurry at a soluble or excess sulfate concentration at less than about 0.0%, that is, not an excess of soluble sulfate over stoichiometric for the formation of calcium sulfate, and at a temperature and $P_2O_5$ concentration such that the calcium sulfate by product comprises the hemihydrate;

(b) adding sulfuric acid, in amounts such that the sulfate content of the sulfuric acid plus the sulfate content of the added phosphate rock is equivalent to about 90% to about 100% of the stoichiometric amount of sulfate required to react with the calcium present in the phosphate rock added in part (a) to form calcium sulfate hemihydrate, to a second reaction vessel which contains a second slurry comprising calcium sulfate hemihydrate, monocalcium phosphate, sulfuric acid and phosphoric acid, whereby the sulfuric acid reacts with the monocalcium phosphate and the phosphate rock to form calcium sulfate hemihydrate and phosphoric acid, said second slurry being maintained at a soluble sulfate concentration of about 0.7% to +4.5%;

(c) circulating a first portion of the first slurry from the first reaction vessel through a first conduit into the second reaction vessel and circulating a first portion of the second slurry from the second reaction vessel through a second conduit into the first reaction vessel, the circulation being continuous;

(d) circulating a second portion of the first slurry within the first reaction vessel and circulating a second portion of the second slurry within the second reaction vessel, at a rate at least equal to 50% of the volume of the slurry in the vessel per minute to better mix the slurries in both the first and second reaction vessels, and (e) separating a third portion of the second slurry into a liquid comprising phosphoric acid and a solid comprising calcium sulfate hemihydrate.

2. The process as recited in claim 1 in which a defoaming agent is added to the first slurry in the first reaction vessel.

3. The process as recited in claim 2 in which a reagent which increases the growth of the calcium sulfate hemihydrate crystals is added to the second reaction vessel.

4. The process as recited in claim 3 in which the second reaction vessel is maintained under a sub atmospheric pressure of about 2 to about 29 inches of mercury absolute.

5. The process as recited in claim 4 in which the second slurry in the second reaction vessel has a slurry specific gravity of between about 1.58 to about 1.99 grams/cc, the liquid portion of said slurry has a specific gravity of from about 1.36 to about 1.72 grams/cc and the $P_2O_5$ analysis of the liquid is about 30% to about 55% by weight.

6. The process as recited in claim 5 in which the second reaction vessel is maintained under a pressure of from about 2 inches to about 29 inches of mercury absolute.

7. The process as recited in claim 1 in which the soluble sulfate concentration of the first slurry in the first reaction vessel is from about −1% to about −3%; the soluble sulfate concentration of the second slurry in the second reaction vessel is from about +2.25% to about 3.25%.

8. The process as recited in claim 1 in which the second reaction vessel is maintained under a reduced pressure, whereby the temperature in the vessel is controlled and evaporative cooling occurs.

9. The process as recited in claim 1 in which the temperature of the slurry in the first and the second reaction vessel is maintained from about 66° C. to about 113° C.

10. The process as recited in claim 1 in which the temperature of the second slurry is maintained between about 66° C. to about 113° C., the specific gravity of the slurry is from about 1.58 to about 1.99 grams/cc, the specific gravity of the liquid portion of the slurry is from about 1.36 to 1.72 grams/cc, the $P_2O_5$ content of the liquid portion of the slurry is from about 30% to about 55% by weight, and the soluble sulfate content of the liquid portion of the slurry is from about 2.25% to about 3.25%.

11. The process as recited in claim 1 in which the phosphoric acid added to the first reaction vessel in step (a) contains from about 1.5% to about 3.5% sulfuric acid by weight.

12. The process of claim 1 wherein the phosphoric acid recovered in step (e) analyzes in the range of 35 to 50% $P_2O_5$.

13. The process of claim 1 wherein said circulation in step (d) is through a draft tube in each instance.

14. The process of claim 13 wherein said first vessel comprises two reactors in series in both of which the solid first slurry is maintained at a soluble sulfate level below 0.0.

15. The process of claim 13 wherein said phosphate rock is added to an additional vessel which is fed to the first of said two reactors in series.

16. A process for the preparation of phosphoric acid from phosphate rock and sulfuric acid comprising the steps of:

(a) adding the phosphate rock and phosphoric acid in the ratio of about 165 parts of phosphate rock to about 240 to about 390 parts of phosphoric acid containing from about 13% to about 47% $P_2O_5$ by weight and from about 0.5% to about 3.5% $H_2SO_4$ by weight to a first reaction vessel which contains a first slurry comprising calcium sulfate hemihydrate, monocalcium phosphate and phosphoric acid and maintained at a temperature and $P_2O_5$ concentration whereby the added phosphate rock is substantially converted to monocalcium phosphate acid while maintaining the first slurry at a soluble sulfate concentration of about +0.7 to about −7%.

(b) adding sulfuric acid to a second reaction vessel in amounts such that the sulfate content of the sulfuric acid plus the sulfate content of the added phosphate rock is equivalent to about 90% to about 99.7% of the stociometric amount of sulfate required to react with the calcium present in the phosphate rock added in part (a) to form calcium sulfate hemihydrate, second reaction vessel containing a second slurry comprising calcium sulfate hemihydrate, monocalcium phosphate, sulfuric acid and phosphoric acid, whereby the sulfuric acid reacts with the monocalcium phosphate to form calcium sulfate hemihydrate and phosphoric acid, said second slurry being maintained at a soluble sulfate concentration of about 0.7% to +4.5%, wherein the slurry has a specific gravity of between about 1.58 to about 1.99 grams/cc and the specific gravity of the liquid portion of the slurry has a specific gravity of from about 1.36 to about 1.72 grams/cc;

(c) circulating a first portion of the first slurry from the first reaction vessel through a first conduit into said second reaction vessel maintained at a reduced pressure and circulating a first portion of the second slurry from the second reaction vessel through a second conduit into the first reaction vessel, the rate of circulation being such that the sulfate levels are maintained from about +0.7 to about −7% in the first reaction vessel and from about +0.7% to about +4.5% in the second reaction vessel, (d) circulating a second portion of the first slurry withing the first reaction vessel and circulating a second portion of the second slurry within the second reaction vessel, through a draft tube in each case, at a rate at least equal to 50% of the volume of the slurry in the vessel per minute to better mix the slurries in both the first and second reaction vessels; and (e) separating into a liquid and solid component a third portion of the second slurry.

* * * * *